US012649309B2

(12) United States Patent
Moriya et al.

(10) Patent No.: US 12,649,309 B2
(45) Date of Patent: Jun. 9, 2026

(54) LIQUID EJECTION APPARATUS, AND EJECTION STATE DETERMINATION APPARATUS

(71) Applicant: CANON KABUSHIKI KAISHA, Tokyo (JP)

(72) Inventors: Takatsugu Moriya, Tokyo (JP); Nobuyuki Hirayama, Kanagawa (JP); Hiroyasu Nomura, Tokyo (JP); Takeshi Murase, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/458,189

(22) Filed: Aug. 30, 2023

(65) Prior Publication Data

US 2024/0109303 A1 Apr. 4, 2024

(30) Foreign Application Priority Data

Sep. 30, 2022 (JP) ................................ 2022-157460

(51) Int. Cl.
*B41J 2/045* (2006.01)
*B41J 2/05* (2006.01)

(52) U.S. Cl.
CPC ......... *B41J 2/0451* (2013.01); *B41J 2/04541* (2013.01); *B41J 2/04563* (2013.01); *B41J 2/0458* (2013.01); *B41J 2/05* (2013.01); *B41J 2202/16* (2013.01)

(58) Field of Classification Search
CPC ...................................................... B41J 2/0451
See application file for complete search history.

(56) References Cited

U.S. PATENT DOCUMENTS

| | | | | |
|---|---|---|---|---|
| 7,699,424 | B2 | 4/2010 | Shihoh | |
| 8,186,798 | B2 | 5/2012 | Aoki | |
| 8,408,673 | B2 * | 4/2013 | Aoki | B41J 2/04588 347/17 |
| 8,444,246 | B2 | 5/2013 | Muro | |
| 8,675,250 | B2 | 3/2014 | Muro | |
| 8,740,333 | B2 | 6/2014 | Teshigawara | |
| 8,757,754 | B2 | 6/2014 | Azuma | |
| 8,931,875 | B2 | 1/2015 | Kosaka | |
| 9,028,029 | B2 | 5/2015 | Azuma | |
| 9,039,112 | B2 | 5/2015 | Murayama | |
| 9,079,421 | B2 | 7/2015 | Kato | |

(Continued)

FOREIGN PATENT DOCUMENTS

| | | |
|---|---|---|
| JP | 2008-000914 A | 1/2008 |
| JP | 2019-171673 A | 10/2019 |

*Primary Examiner* — Shelby L Fidler
(74) *Attorney, Agent, or Firm* — Venable LLP

(57) ABSTRACT

In order to make it less likely for the accuracy of determination of the ejection state of a liquid ejection head to be low, a liquid ejection apparatus sets a determination threshold for determining an ejection state of the liquid ejection head using first energy, the determination threshold being set based on a first output value outputted from the output unit in an event where the heat generating resistance element is driven with the first energy in an ejection state in which the liquid is ejected from an ejection port and a second output value estimated to be outputted from the output unit assuming the heat generating resistance element is driven with the first energy in a non-ejection state in which the liquid is not ejected.

13 Claims, 16 Drawing Sheets

| Vp_d - Vp_ft | Dth |
|---|---|
| BELOW 0.032 | Vp_ft + 0.008 |
| 0.032 OR ABOVE AND BELOW 0.040 | Vp_ft + 0.016 |
| 0.040 OR ABOVE AND BELOW 0.048 | Vp_ft + 0.024 |
| 0.048 OR ABOVE AND BELOW 0.056 | Vp_ft + 0.032 |
| 0.056 OR ABOVE AND BELOW 0.064 | Vp_ft + 0.040 |
| 0.064 OR ABOVE AND BELOW 0.072 | Vp_ft + 0.048 |
| 0.072 OR ABOVE AND BELOW 0.088 | Vp_ft + 0.056 |
| 0.088 OR ABOVE AND BELOW 0.104 | Vp_ft + 0.064 |
| 0.104 OR ABOVE AND BELOW 0.120 | Vp_ft + 0.072 |
| 0.120 OR ABOVE AND BELOW 0.136 | Vp_ft + 0.080 |
| 0.136 OR ABOVE AND BELOW 0.152 | Vp_ft + 0.096 |
| 0.152 OR ABOVE AND BELOW 0.168 | Vp_ft + 0.104 |
| 0.168 OR ABOVE AND BELOW 0.184 | Vp_ft + 0.120 |
| 0.184 OR ABOVE AND BELOW 0.200 | Vp_ft + 0.128 |
| 0.200 OR ABOVE AND BELOW 0.216 | Vp_ft + 0.136 |
| 0.216 OR ABOVE | Vp_ft + 0.152 |

(56) References Cited

U.S. PATENT DOCUMENTS

| | | | | |
|---|---|---|---|---|
| 9,138,991 | B2 | 9/2015 | Murase | |
| 9,409,390 | B1 | 8/2016 | Nishikori | |
| 9,975,347 | B2 | 5/2018 | Tozuka | |
| 10,755,151 | B2 | 8/2020 | Ishii | |
| 10,766,251 | B2 | 9/2020 | Oikawa | |
| 10,960,665 | B2 | 3/2021 | Nomura | |
| 10,994,532 | B2 | 5/2021 | Ishida | |
| 11,020,959 | B2 | 6/2021 | Murase | |
| 11,097,535 | B2 * | 8/2021 | Oikawa | B41J 2/0451 |
| 11,155,078 | B2 | 10/2021 | Umezawa | |
| 11,351,774 | B2 | 6/2022 | Oikawa | |
| 2007/0291067 | A1 | 12/2007 | Aoki | |
| 2019/0299590 | A1 * | 10/2019 | Oikawa | B41J 2/0458 |
| 2020/0108597 | A1 * | 4/2020 | Oikawa | B41J 2/0451 |
| 2020/0180308 | A1 * | 6/2020 | Moriya | B41J 2/0451 |
| 2020/0298555 | A1 | 9/2020 | Oikawa | |
| 2021/0060927 | A1 * | 3/2021 | Oikawa | B41J 2/0454 |
| 2021/0252851 | A1 | 8/2021 | Murase | |
| 2021/0300031 | A1 | 9/2021 | Kawafuji | |
| 2021/0402813 | A1 | 12/2021 | Murase | |
| 2022/0016882 | A1 | 1/2022 | Umezawa | |
| 2023/0008821 | A1 | 1/2023 | Hamada | |
| 2023/0191798 | A1 | 6/2023 | Nitta | |
| 2023/0202193 | A1 | 6/2023 | Yamamuro | |

* cited by examiner

| Vp_d - Vp_ft | Dth |
|---|---|
| BELOW 0.032 | Vp_ft + 0.008 |
| 0.032 OR ABOVE AND BELOW 0.040 | Vp_ft + 0.016 |
| 0.040 OR ABOVE AND BELOW 0.048 | Vp_ft + 0.024 |
| 0.048 OR ABOVE AND BELOW 0.056 | Vp_ft + 0.032 |
| 0.056 OR ABOVE AND BELOW 0.064 | Vp_ft + 0.040 |
| 0.064 OR ABOVE AND BELOW 0.072 | Vp_ft + 0.048 |
| 0.072 OR ABOVE AND BELOW 0.088 | Vp_ft + 0.056 |
| 0.088 OR ABOVE AND BELOW 0.104 | Vp_ft + 0.064 |
| 0.104 OR ABOVE AND BELOW 0.120 | Vp_ft + 0.072 |
| 0.120 OR ABOVE AND BELOW 0.136 | Vp_ft + 0.080 |
| 0.136 OR ABOVE AND BELOW 0.152 | Vp_ft + 0.096 |
| 0.152 OR ABOVE AND BELOW 0.168 | Vp_ft + 0.104 |
| 0.168 OR ABOVE AND BELOW 0.184 | Vp_ft + 0.120 |
| 0.184 OR ABOVE AND BELOW 0.200 | Vp_ft + 0.128 |
| 0.200 OR ABOVE AND BELOW 0.216 | Vp_ft + 0.136 |
| 0.216 OR ABOVE | Vp_ft + 0.152 |

FIG.8C

LIQUID EJECTION APPARATUS, AND EJECTION STATE DETERMINATION APPARATUS

BACKGROUND OF THE INVENTION

Field of the Invention

The present disclosure relates to a liquid ejection apparatus having a function to determine the liquid ejection state of a liquid ejection head, and to an ejection state determination apparatus.

Description of the Related Art

A thermal inkjet method is known as a liquid ejection method used by a liquid ejection head mounted on a liquid ejection apparatus such as an inkjet printing apparatus. In the thermal inkjet method, heat is applied to liquid to cause film boiling, and the force of the bubble generation is utilized to eject the liquid from ejection ports.

Such a liquid ejection head may experience non-ejection or an ejection failure of liquid (ink) due to, e.g., clogging of ejection ports or change in the wettability of the surfaces of the ejection ports. In this case, it is preferable that a recovery operation for recovering the ejection state or the like be executed immediately. To this end, it is required that the ejection state of the liquid ejection head be determined accurately and speedily.

Against this backdrop, Japanese Patent Laid-Open No. 2008-000914 proposes a method for determining the ejection state by detecting whether there is a point of change (a characteristic point) in the rate of decrease of temperature detected by temperature detection elements during ejection operation, the temperature detection elements being provided for the respective print elements inside a print element board. However, the sensitivities of temperature sensors may change due to temporal change of the temperature detection elements or change in the state of a protective film for the print elements.

Japanese Patent Laid-Open No. 2019-171673 discloses a technique for accommodating fluctuations in an output from a temperature detection element due to temporal change or the like. In Japanese Patent Laid-Open No. 2019-171673, the print elements are driven by application of two types of pulses: a first pulse for ejecting liquid and a second pulse for not ejecting liquid. Then, outputs outputted from the temperature detection element in an event where the print element is driven by the respective pulses are measured, and based on the measurement results, a threshold for determining the ejection state of the liquid ejection head is updated.

In the ejection state determination method described in Japanese Patent Laid-Open No. 2019-171673, because a value which would be outputted from a temperature detection element by application of the first pulse in a case where an ejection failure is occurring is unknown, a threshold for ejection state determination is set to a value lowered by a certain value from a value outputted from the temperature detection element in a state where liquid is ejected. For this reason, depending on the setting of the certain value, the accuracy of the ejection state determination may be low in a case where there is variability in outputs from the temperature detection elements due to manufacturing variability or the like.

SUMMARY OF THE INVENTION

Thus, the present disclosure aims to provide a technique for properly determining the ejection state of a liquid ejection head while reducing influence by manufacturing variability in the liquid ejection head.

In a first aspect of the present invention, there is provided a liquid ejection apparatus including a liquid ejection head having a heat generating resistance element, a temperature detection element that detects temperature corresponding to the heat generating resistance element, and an ejection port provided in correspondence with the heat generating resistance element, the liquid ejection apparatus being configured to eject liquid from the ejection port by driving the heat generating resistance element, the liquid ejection apparatus comprising: an output unit configured to output a value in accordance with a detection output from the temperature detection element; a threshold setting unit configured to set a determination threshold for determining an ejection state of the liquid ejection head using first energy, the determination threshold being set based on a first output value outputted from the output unit in a case where the heat generating resistance element is driven with the first energy in an ejection state in which the liquid is ejected from the ejection port and a second output value estimated to be outputted from the output unit assuming the heat generating resistance element is driven with the first energy in a non-ejection state in which the liquid is not ejected; and a determination unit configured to determine the ejection state by comparing an output value outputted from the output unit in a case where the heat generating resistance element is driven with the first energy with the determination threshold, wherein the threshold setting unit estimates the second output value by using a plurality of output values outputted from the output unit in the non-ejection state in a case where the heat generating resistance element is driven with a plurality of levels of energy.

In a second aspect of the present invention, there is provided an ejection state determination apparatus for determining an ejection state of a liquid ejection head having a heat generating resistance element, a temperature detection element that detects temperature corresponding to the heat generating resistance element, and an ejection port provided in correspondence with the heat generating resistance element, the liquid ejection head being configured to eject liquid from the ejection port by driving of the heat generating resistance element, the ejection state determination apparatus comprising: an output unit configured to output a value in accordance with a detection output from the temperature detection element; a threshold setting unit configured to set a determination threshold for determining the ejection state of the liquid ejection head using the first energy, the determination threshold being set based on a first output value outputted from the output unit in a case where the heat generating resistance element is driven with first energy in an ejection state in which the liquid is ejected from the ejection port and a second output value estimated to be outputted from the output unit assuming the heat generating resistance element is driven with the first energy in a non-ejection state in which the liquid is not ejected; and a determination unit configured to determine the ejection state by comparing an output value outputted from the output unit in a case where the heat generating resistance element is driven with the first energy with the determination threshold, wherein the threshold setting unit estimates the second output value by using an output value outputted from the output unit in an event where the heat generating resistance element is driven with second energy in the non-ejection state and a relation between output values outputted from the output unit in an event where the heat generating resistance element is driven and values of energy used to obtain the respective output values, which is measured in advance in the non-ejection state.

Further features of the present invention will become apparent from the following description of exemplary embodiments with reference to the attached drawings.

BRIEF DESCRIPTION OF THE DRAWINGS

FIGS. 8A to 8C are diagrams showing flowcharts showing processing in a first embodiment and a reference table;

DESCRIPTION OF THE EMBODIMENTS

Figure 1A:
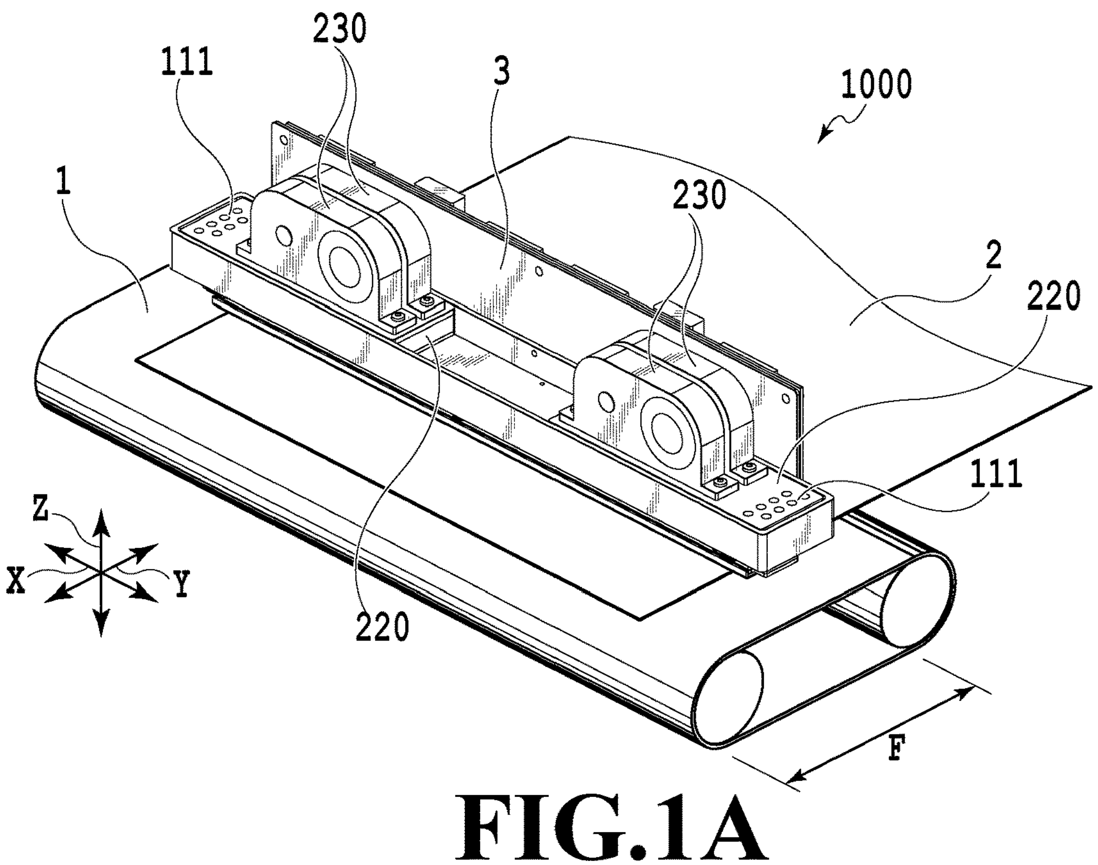
FIGS. 1A and 1B are diagrams showing schematic configurations of a printing apparatus and a print head.

Embodiments of the present invention are described in detail below with reference to the drawings attached hereto. Note that the embodiments below are not intended to limit the present invention according to the scope of claims, and not all the combinations of the features described in the present embodiments are necessarily essential as solutions of the present invention.

Also, although an inkjet printing apparatus is described below as an example of an embodiment of a liquid ejection apparatus of the present disclosure, the liquid ejection apparatus is not limited to a printing apparatus. The liquid ejection apparatus may be, for example, a single-function printer having only a print function or a multifunctional printer having a plurality of functions such as a print function, a fax function, and a scanner function. Also, the liquid ejection apparatus may be, e.g., a manufacturing apparatus for manufacturing a color filter, an electronic device, an optical device, a microstructure, or the like using a predetermined printing method, or a microbubble generation apparatus.

Also, the term "print" as used in the descriptions below may be not only for forming meaningful information such as text or graphics, but also for unmeaningful information. The term "print" may also broadly represent forming an image, a design, a pattern, a structure or the like on a print medium or processing a medium, irrespective of whether it is tangible to be visually perceived by humans. Also, a "printing medium" is not only paper used for typical printing apparatuses, but also any medium that can receive ink, such as fabric, a plastic film, a metal plate, glass, ceramics, resin, wood, or leather.

Further, "ink" should be interpreted broadly like the above-described "print" should. Thus, "ink" is liquid that can be used for formation of an image, a design, a pattern, or the like, processing of a print medium, or processing of ink (e.g., coagulation or insolubilization of a coloring material in ink applied to a printing medium) by being applied onto a printing medium. Also, an "ejection element part" refers collectively to a liquid ejection port, a liquid channel communicating with the ejection port, an element for generating heat energy for ejecting the liquid (a heat generating resistance element), and a driving circuit therefor, unless otherwise noted.

A print element board for a print head used below does not simply refer to a base made of silicon semiconductor, but refers to a structure having the elements, wiring, and the like.

A liquid ejection head exemplified in the present embodiments is what is called a line-type head having a length corresponding to the width of a printing medium, but the present disclosure can also be applied to what is called a serial printing apparatus that performs printing while scanning the printing medium. Examples of the configuration of a serial-type liquid ejection head include one in which a print element board for black (Bk) ink and a print element board for each color ink are mounted, but the present disclosure is not limited to this. A mode may be employed in which a short print head having a plurality of print element boards for the respective ink colors disposed to overlap in an ejection port arrangement direction is scanned relative to a printing medium.

<Inkjet Printing Apparatus>

FIG. 1A shows schematic configurations of an inkjet printing apparatus 1000 (hereinafter also referred to as a printing apparatus) and a print head (liquid ejection head) 3 of the present embodiments. The printing apparatus 1000 is a full-line printing apparatus including (1) a conveyance unit 1 that conveys a printing medium 2 and (2) the line-type print head 3 disposed substantially orthogonal to the direction in which the printing medium 2 is conveyed. Specifically, the printing apparatus 1000 performs continuous printing with one pass using the print head 3 being held at a fixed position while conveying a plurality of printing media 2 continuously or intermittently. The printing medium 2 is not limited to a cut sheet of paper, but may be a continuous roll of paper. The print head 3 can perform full-color printing by ejecting C (cyan) ink, M (magenta) ink, Y (yellow) ink, and K (black) ink. The print head 3 is configured including negative pressure control units 230 that control pressure (negative pressure) in ink channels and liquid supply units 220 communicating with the negative pressure control units 230. The liquid supply units 220 are provided with liquid connection portions 111 through which ink is supplied and discharged. Via the liquid connection portions 111, the print head 3 is fluidically connected to a main tank (not shown) and a liquid supply unit (not shown) which is a supply channel through which liquid is supplied to the print head.

Figure 1B:
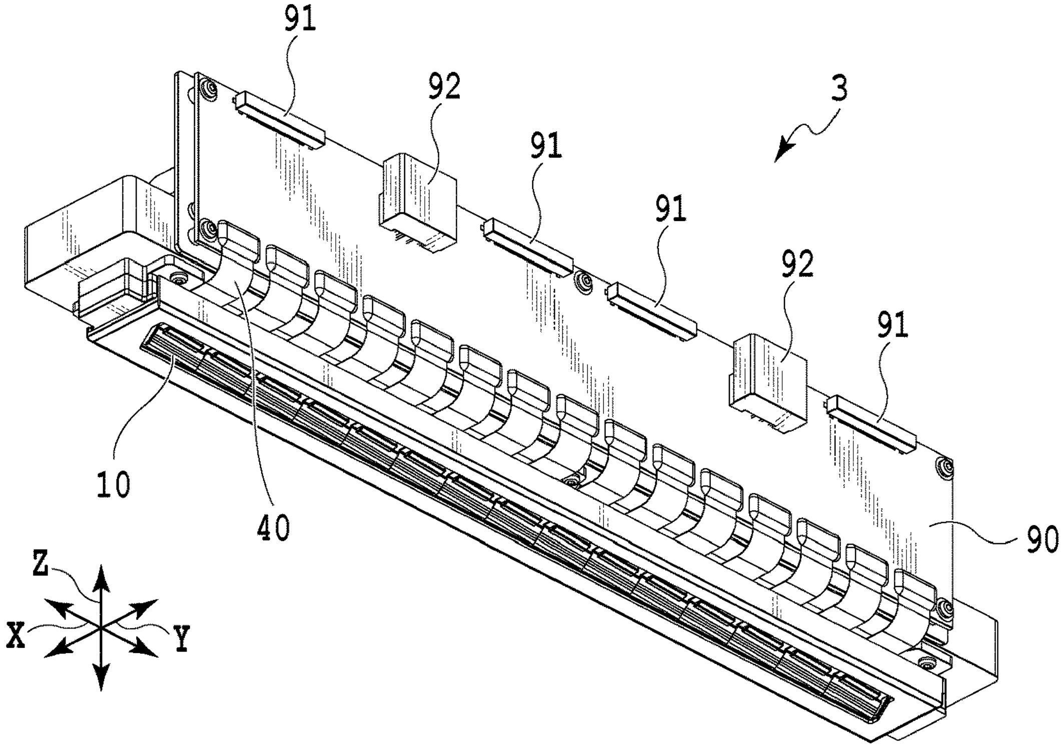

FIG. 1B is a perspective view of the print head 3 according to the present embodiments. The print head 3 is a line-type print head in which 15 print element boards 10 each capable of ejecting four colors C, M, Y, and K are arrayed (arranged in line) in a direction (the X-direction) orthogonal to the direction of conveyance of the printing medium 2 (the Y-direction). Each print element board 10 has, for each ink color, an ejection port array formed by a plurality of liquid-ejecting ejection ports arranged in the X-direction.

Also, the print head 3 includes the print element boards 10, signal input terminals 91 electrically connected to the print element boards 10 via an electric wiring substrate 90 and flexible wiring substrates 40, and power supply terminals 92. The signal input terminals 91 and the power supply terminals 92 are electrically connected to a control unit of the printing apparatus 1000 and supply the print element board 10 with ejection drive signals and power needed for the ejection, respectively. Wiring aggregation by electric circuits in the electric wiring substrate 90 makes it possible to have less signal input terminals 91 and power supply terminals 92 than the print element boards 10. This reduces the number of electric connections that need to be attached and detached at the time of attaching the print head 3 to the printing apparatus 1000 or replacing the print head.

Also, the printing medium 2 is conveyed by rotation of two conveyance rollers provided at a distance of a length F from each other in the conveyance direction.

<Description of the Control Configuration>

Figure 2:
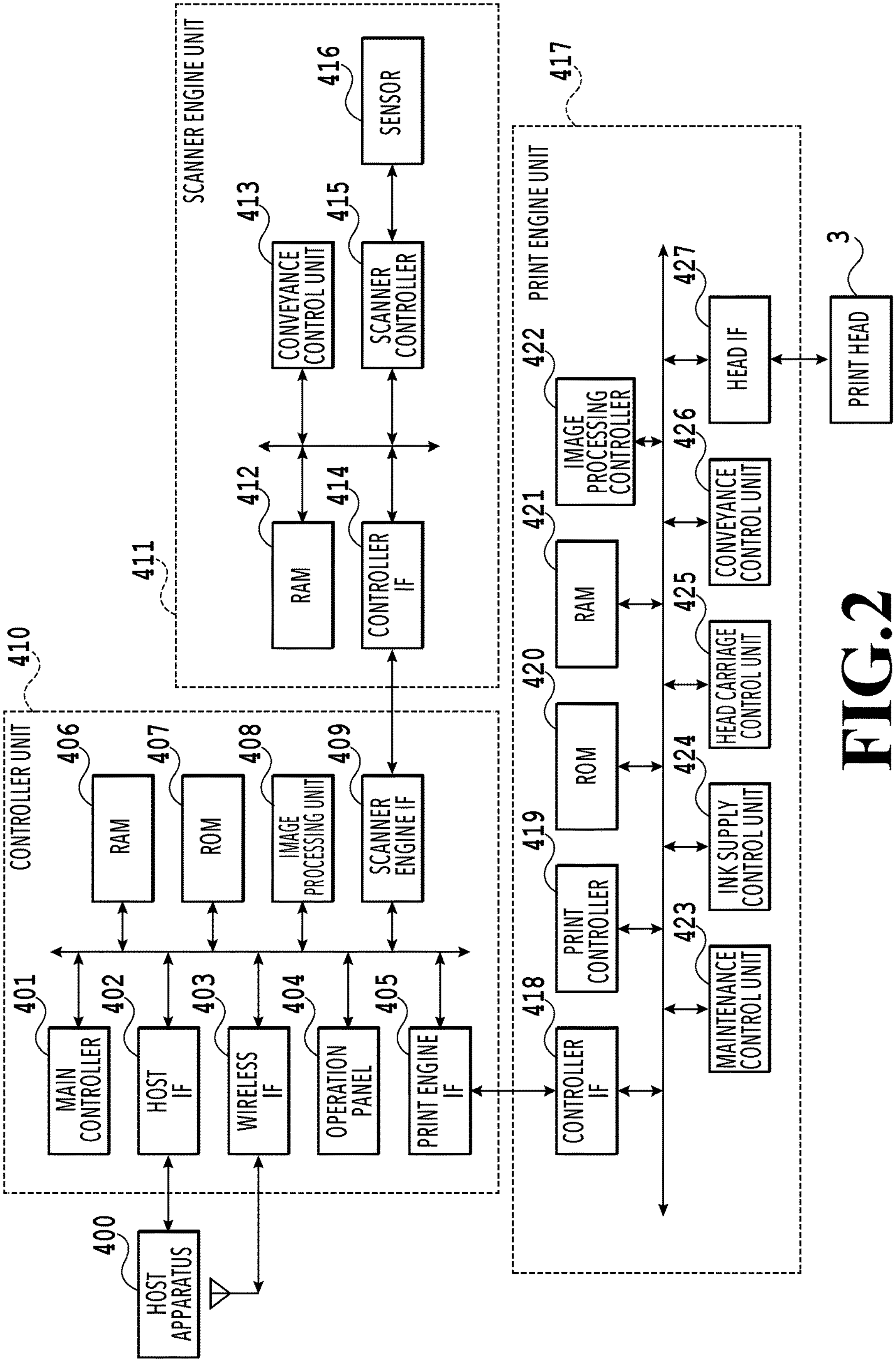
FIG. 2 is a block diagram showing the configuration of a control circuit of the printing apparatus.

FIG. 2 is a block diagram showing the configuration of a control circuit of the printing apparatus 1000. As shown in FIG. 2, the printing apparatus 1000 is configured mainly by a print engine unit 417 that performs overall control of a print unit, a scanner engine unit 411 that performs overall control of a scanner unit, and a controller unit 410 that performs overall control of the entire printing apparatus 1000. A print controller 419, which has an MPU and non-volatile memory (such as EEPROM) therein, controls various mechanisms of the print engine unit 417 as instructed by a main controller 401 of the controller unit 410. Various mechanisms of the scanner engine unit 411 are controlled by the main controller 401 of the controller unit 410.

Details of the control configuration are described below. In the controller unit 410, the main controller 401 formed of a CPU controls the entire printing apparatus 1000 in accordance with programs and various parameters stored in a ROM 407, while using a RAM 406 as work area. For example, in response to input of a print job from a host apparatus 400 via a host I/F 402 or a wireless I/F 403, an image processing unit 408 performs predetermined image processing on received image data as instructed by the main controller 401. Then, the main controller 401 transmits the image data resulting from the image processing to the print engine unit 417 via a print engine I/F 405.

Note that the printing apparatus 1000 may obtain image data from the host apparatus 400 via wireless or wired communications or may obtain image data from an external storage apparatus (such as a USB memory stick) connected to the printing apparatus 1000. A communication method used for the wireless or wired communications is not limited to a particular one. Examples of a communication method usable for wireless communications include Wireless Fidelity (Wi-Fi) (registered trademark) and Bluetooth (registered trademark). Also, Universal Serial Bus (USB) or the like is usable as a communication method used for wired communications. Also, for example, in response to input of a scan instruction from the host apparatus 400, the main controller 401 transmits this instruction to the scanner engine unit 411 via a scanner engine I/F 409.

An operation panel 404 is a unit for a user to input/output information to/from the printing apparatus 1000. Via the operation panel 404, a user can instruct an action such as copy or scan, configure print mode settings, or check information on the printing apparatus 1000.

In the print engine unit 417, the print controller 419 formed of a CPU controls various mechanisms of the print engine unit 417 in accordance with programs and various parameters stored in a ROM 420, while using a RAM 421 as a work area. For example, the print controller 419 has a function to set threshold setting data Ddth for determining the liquid ejection state of the print head 3. Thus, the print controller 419 implements a function as a threshold setting unit of the present disclosure together with a shift register 941, a latch circuit 942, a digital-to-analog converter (DAC) 943, and the like, which will be described later with reference to FIG. 6A.

Upon receipt of various commands and image data via a controller I/F 418, the print controller 419 saves them in the RAM 421 temporarily. In order for the print head 3 to be used for a print operation, the print controller 419 causes an image processing controller 422 to convert the saved image data into print data. Once the print data is generated, the print controller 419 causes, via a head I/F 427, the print head 3 to execute a print operation based on the print data. In this event, the print controller 419 conveys the printing medium 2 by driving conveyance rollers 81, 82 via a conveyance control unit 426. As instructed by the print controller 419, the print head 3 executes a print operation in conjunction with the operation of conveying the printing medium 2, and print processing is thereby performed.

A head carriage control unit 425 changes the direction and position of the print head 3 according to the maintenance status or the operation status, such as print status, of the printing apparatus 1000. An ink supply control unit 424 controls the liquid supply unit 220 so that the pressure of the ink supplied to the print head 3 may fall within a proper range. While a maintenance operation is performed for the print head 3, a maintenance control unit 423 controls the operations of a cap unit and a wiping unit in a maintenance unit (not shown).

In the scanner engine unit 411, the main controller 401 controls the hardware resources of a scanner controller 415 in accordance with the programs and various parameters stored in the ROM 407, while using the RAM 406 as a work area. The various mechanisms of the scanner engine unit 411 are thereby controlled. For example, via a controller I/F 414, the main controller 401 controls the hardware resources in the scanner controller 415 to convey an original placed by a user on an ADF (not shown) via a conveyance control unit 413 and scan the original with a sensor 416. Then, the scanner controller 415 saves the scanned image data in a RAM 412.

Note that, by converting the thus-obtained image data into print data, the print controller 419 can cause the print head 3 to execute a print operation based on the image data scanned by the scanner controller 415.

<Description of the Structure of the Print Element Board>

Figure 3A:
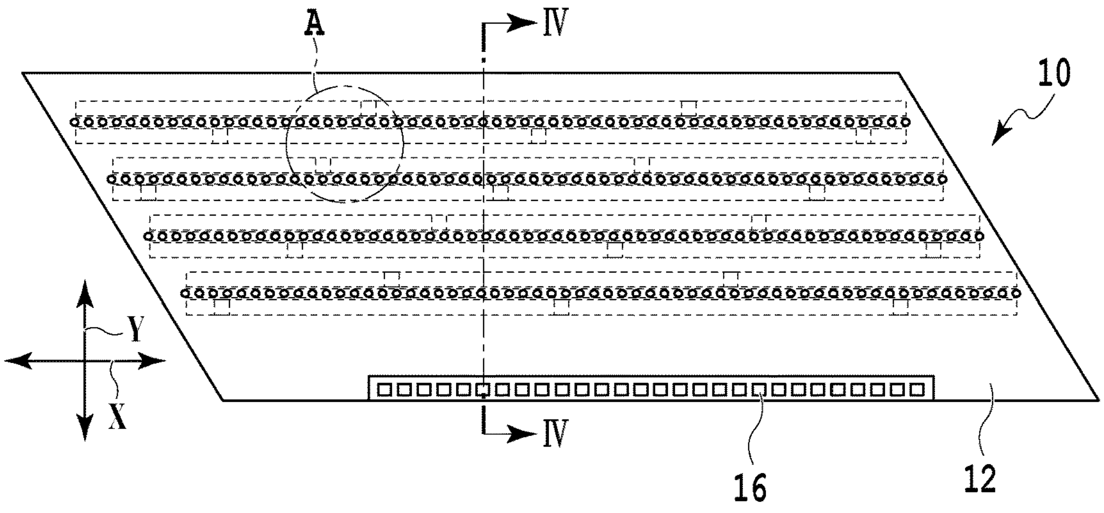
FIGS. 3A to 3C are diagrams showing the configuration of a print element board.
Figure 3B:
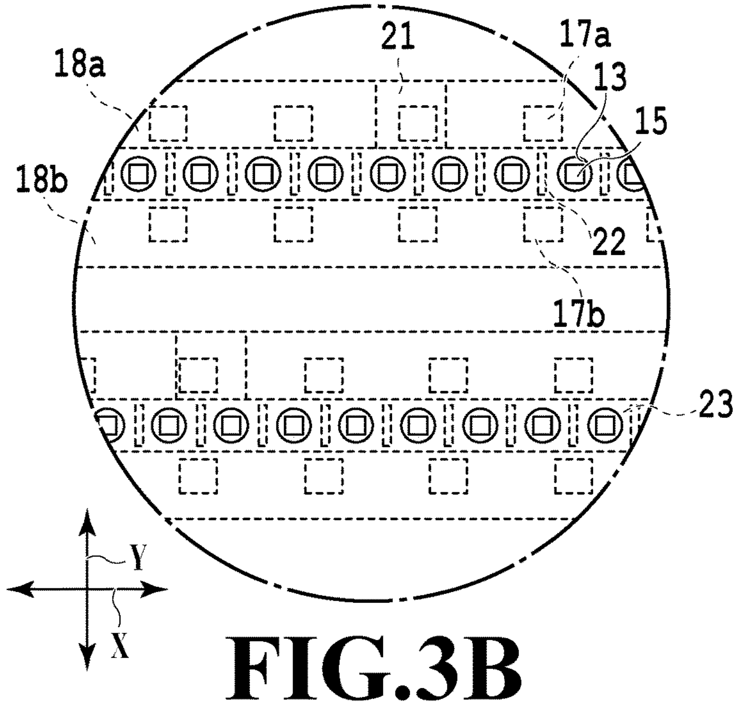
Figure 3C:
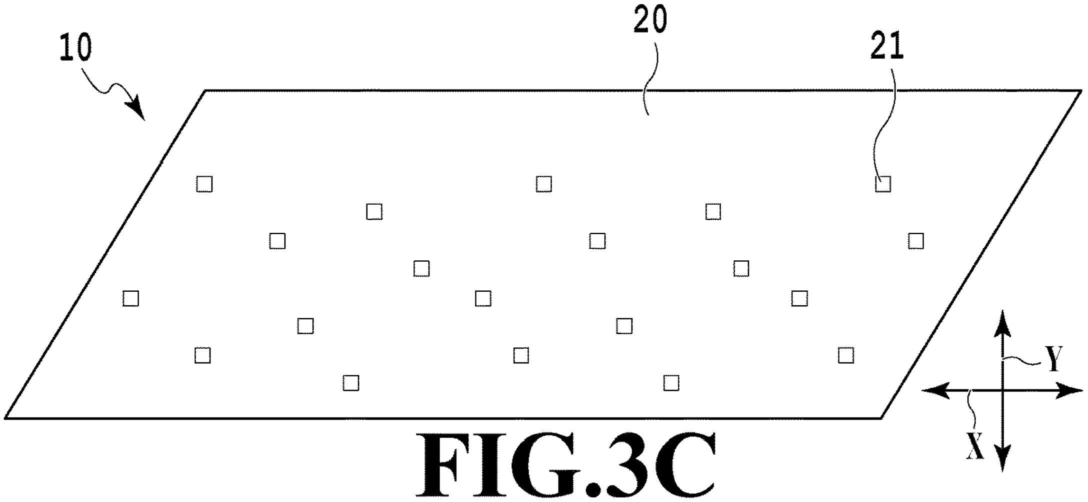
Figure 4:
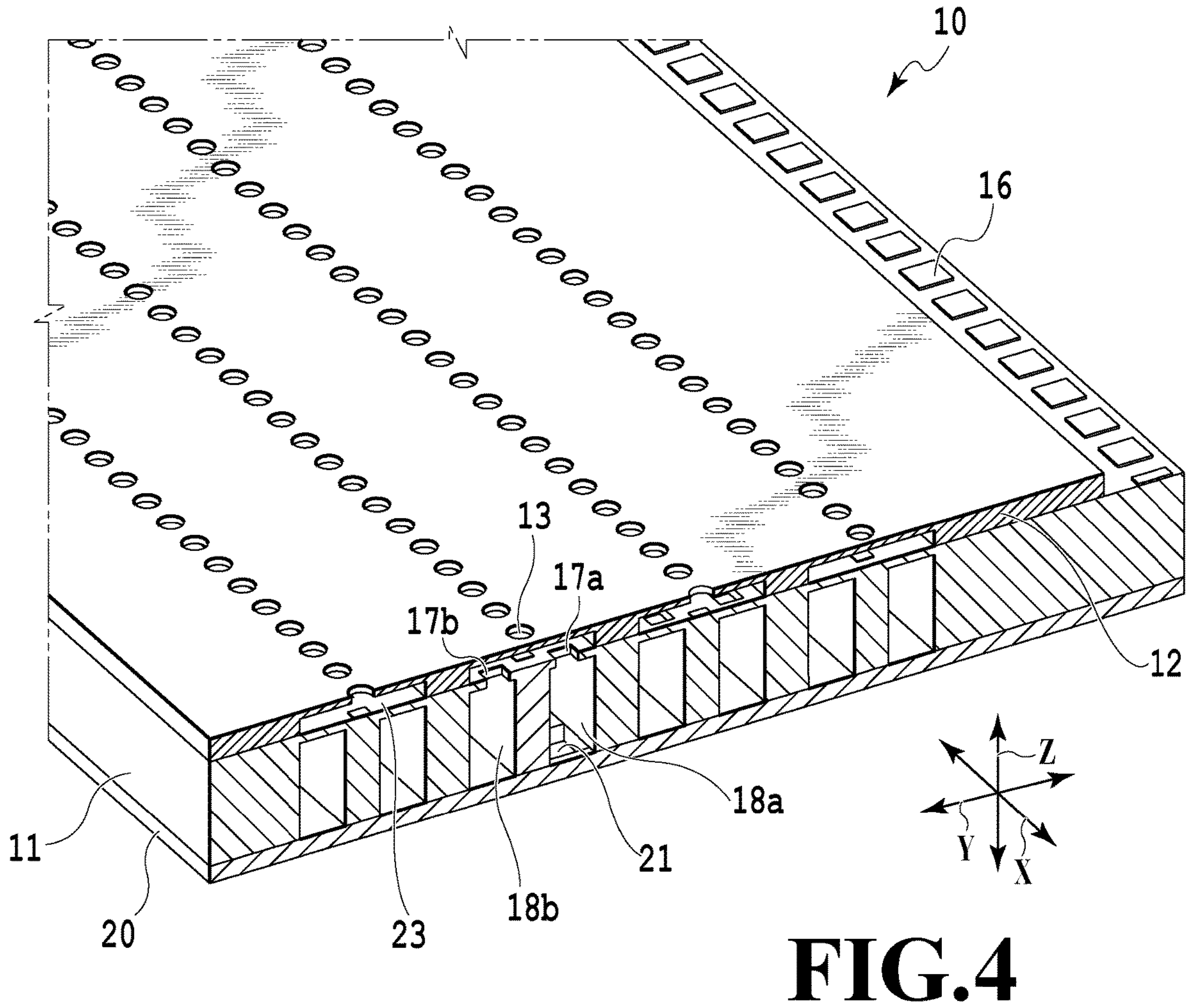
FIG. 4 is a perspective sectional view showing a section of the print element board and a lid member shown in FIG. 3A cut along the line IV-IV.

The configuration of the print element board 10 of the present embodiments is described. FIGS. 3A to 3C are diagrams showing the configuration of the print element board 10, FIG. 3A being a plan view of a surface of the print element board 10 where ejection ports 13 are formed, FIG. 3B being an enlarged view of a portion A in FIG. 3A, and FIG. 3C being a plan view of the back surface of FIG. 3A. Also, FIG. 4 is a perspective sectional view showing a section of the print element board 10 and a lid member 20 shown in FIG. 3A cut along the line IV-IV.

As shown in FIG. 3A, four ejection port arrays corresponding to respective ink colors are formed in an ejection port formation member 12 of the print element board 10. In FIGS. 3A to 3C, the X-direction denotes a direction in which the ejection ports are arranged, and the Y-direction denotes a direction orthogonal to the X-direction. Note that the print element board 10 shown in FIGS. 3A to 3C is one of the print element boards 10 arranged in the X-direction as shown in FIG. 1.

As shown in FIG. 3B, heaters 15 are disposed at positions corresponding to the respective ejection ports 13, the heaters 15 being heat generating resistance elements for generating bubbles in ink using heat energy. A plurality of pressure chambers 23 each including the heater 15 inside are partitioned by partitioning walls 22. The heaters 15 are electrically connected to terminals 16 in FIG. 3A via electric wiring (not shown) provided at the print element board 10. The heater 15 boils ink by generating heat based on a pulse signal inputted from the print engine unit 417 of the printing apparatus 1000 via the electric wiring substrate 90 and the flexible wiring substrate 40. Ink is ejected from the ejection port 13 by the force of the bubble generated by the boiling. As shown in FIG. 3B, liquid supply channels 18*a*, 18*b* extend along each of the ejection port arrays, and the liquid supply channels 18*a*, 18*b* communicate with the ejection ports 13 via supply channels 17*a*, 17*b*, respectively.

As shown in FIG. 3C, a sheet-shaped lid member 20 is stacked on a surface of the print element board 10 opposite from the surface where the ejection ports 13 are formed, and the lid member 20 is provided with a plurality of openings 21 communicating with the liquid supply channels 18*a*, 18*b*. In the present embodiment, the lid member 20 is provided with three openings 21 for a single liquid supply channel 18*a* and two openings 21 for a single liquid supply channel 18*b*. As shown in FIG. 4, the lid member 20 functions as a lid, forming part of the walls of the liquid supply channels 18*a*, 18*b* formed in a substrate 11 of the print element board 10. The lid member 20 is preferably configured by a material with sufficient corrosion resistance against ink. Also, from the perspective of preventing mixing of colors, high accuracy is required for the opening shapes and opening positions of the openings 21 formed in the lid member 20. For this reason, it is preferable to use a photosensitive resin material and a silicon plate as a material for the lid member 20 and form the openings 21 through a photolithography process. Considering pressure loss, the lid member 20 is desirably thin in thickness and is preferably formed by a film-shaped member.

Next, the internal structure of the print element board 10 and the flow of ink in the print element board 10 are described with reference to FIG. 4. The print element board 10 has a configuration such that the substrate 11 formed of silicon (Si) and the ejection port formation member 12 formed of photosensitive resin are stacked on each other. The above-described lid member 20 is joined to one of the surfaces of the substrate 11 (the lower surface in FIG. 4). The heaters 15 are formed in a wall portion forming the other surface of the substrate 11 (the upper surface in FIG. 4). Also, grooves are formed in the substrate 11, forming the liquid supply channels 18*a*, 18*b* extending along the ejection port arrays. The liquid supply channels 18*a*, 18*b* formed by the substrate 11 and the lid member 20 are each connected to the negative pressure control unit 230 via a shared supply flow channel (not shown).

An example of the printing apparatus and an example of the print head 3 of the embodiments of the present disclosure have thus been described above. The printing apparatus and the print head 3 described above are applied to the first to fifth embodiments to be described below.

First Embodiment

Figure 5A:
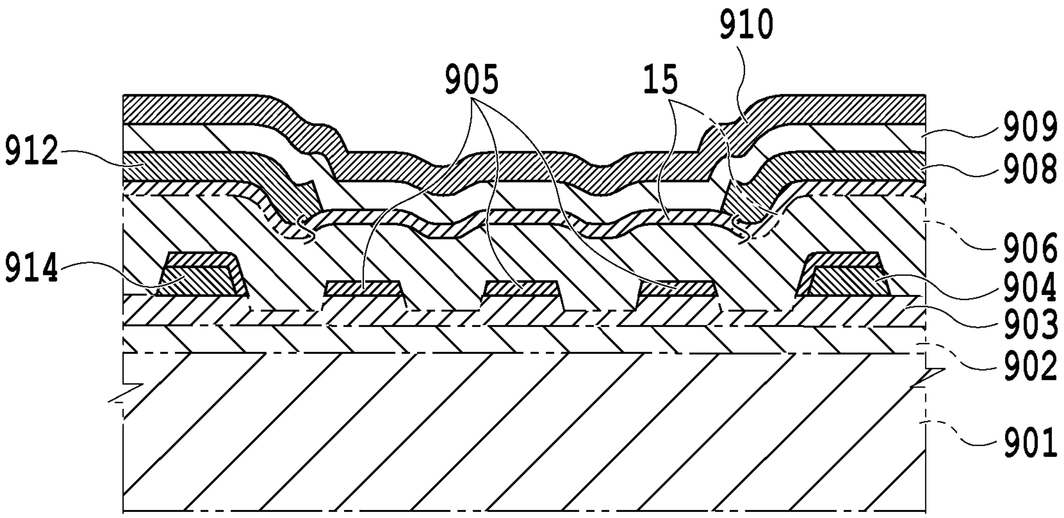
FIGS. 5A and 5B are partially-enlarged diagrams showing a part of the print element board in an enlarged manner.

FIGS. 5A to 8C show an overview of the first embodiment. FIGS. 5A and 5B are partially-enlarged diagrams showing a part of the print element board 10 of the present embodiment in an enlarged manner, FIG. 5A showing an example of a sectional configuration of a part including the heater 15 and a temperature detection element 905 formed in the print element board 10, and FIG. 5B showing an example of a planar configuration of the part including the heater 15 and the temperature detection element 905. Note that FIG. 5A is a sectional view taken along the line VA-VA in FIG. 5B, and FIG. 5B is a plan view seen from the Si substrate 901 side, showing the positional relation of the temperature detection element 905. For the descriptive convenience, FIGS. 5A and 5B do not show nozzle parts such as the ejection ports 13 and some films.

As shown in FIG. 5A, in the print element board 10, a plurality of films are formed on the Si substrate 901. Specifically, an insulating film PSG 903 is formed on the Si substrate 901 with a field oxide film 902, such as $SiO_2$, interposed in between. On the insulating film PSG 903, the temperature detection element 905 formed of a thin-film resistor, such as Al, Pt, Ti, or Ta, and AL1 wiring 904 that interconnects the temperature detection element 905 are provided.

Then an interlayer insulating film 906, such as SiO, is provided as an upper layer of the temperature detection element 905 and the insulating film PSG 903. Provided on the interlayer insulating film 906 are the heater 15 which is TaSiN or the like and performs electrothermal conversion and AL2 wiring 908 which connects the heater 15 to a drive circuit formed on the Si substrate 901. Further, a passivation film 909 formed of $SiO_2$ and the like is provided on the AL2 wiring 908, and an anti-cavitation film 910 which is Ta, Ir, or the like and improves the anti-cavitation property on the heater 15 is provided on the passivation film 909.

Figure 5B:
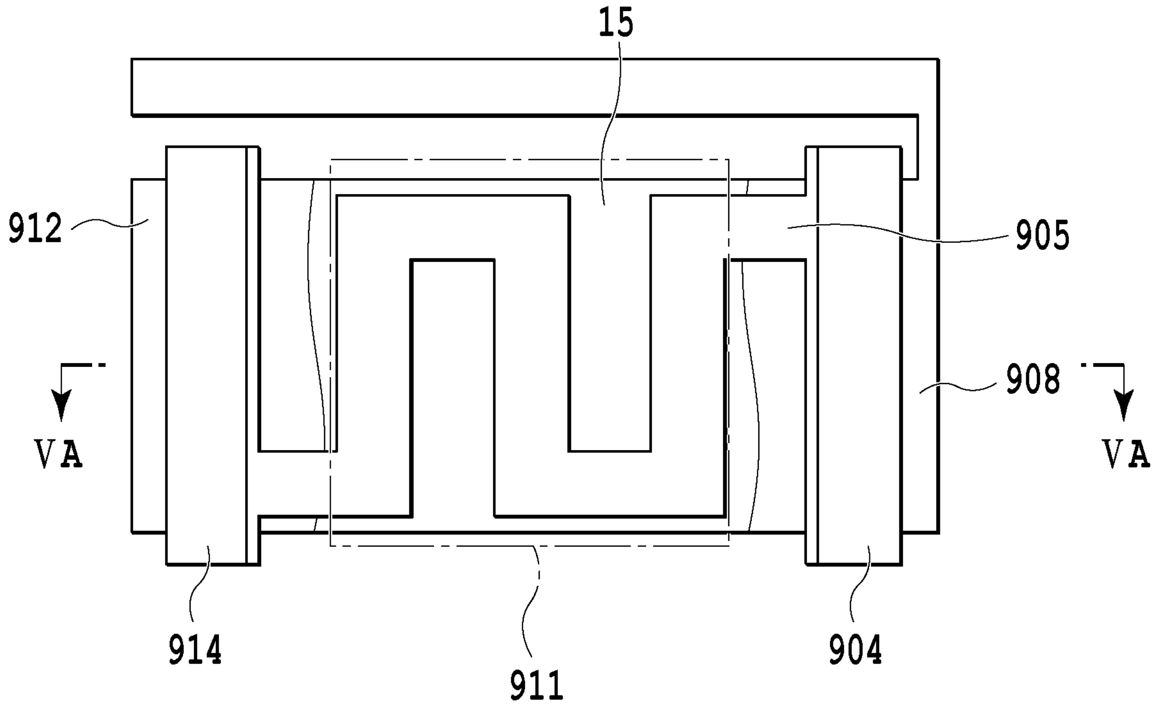

As shown in FIG. 5B, on a planar surface of the print element board 10, there are a region 911 for forming the heater 15, a region 912 for forming the AL2 wiring 908 that connects the heater 15 to the drive circuit, and a region 914 for forming the AL1 wiring 904 which is individual wiring for the temperature detection element 905. Such a configuration of the print element board 10 is formed through a semiconductor process. In the print element board 10 in the present embodiment, the temperature detection element 905 can be fabricated through film formation and patterning on the AL1 wiring 904. Thus, the temperature detection element 905 can be fabricated without changing the structure of the conventional print element board.

Although the temperature detection element 905 shown in FIG. 5B is formed in a zigzag shape, it is to be noted that the present disclosure is not limited to this. For example, the temperature detection element 905 may be formed in a rectangular shape. However, with the zigzag shape shown in FIG. 5B, the larger the resistance value of the temperature detection element 905, the larger the detection signal (detection output), which offers an advantage that a temperature change in accordance with the amount of heat generated by the heater 15 can be detected with higher accuracy.

Next, profiles of temperature detected by the temperature detection element 905 upon application of an application voltage for ink ejection to the heater 15 is described with reference to FIGS. 6A to 6D. Note that application energy which, by being applied to the heater 15, causes liquid to be normally ejected from an ejection port with the heater 15, its drive circuit, and the ejection port being in a state of being capable of ejecting liquid normally is referred to as ejection enabling energy. Also, the smallest one of the values of ejection enabling energy is referred to as minimum ejection enabling energy (minimum energy). Further, an application voltage applied to the heater 15 to apply the ejection enabling energy to the heater 15 is referred to as an ejection enabling voltage. Also, a part in the print element board 10 which includes the heater 15, the drive circuit for the heater 15, the ejection port, and the like is also collectively referred to as an ejection element part.

Figures 6A, 6B, 6C, 6D:
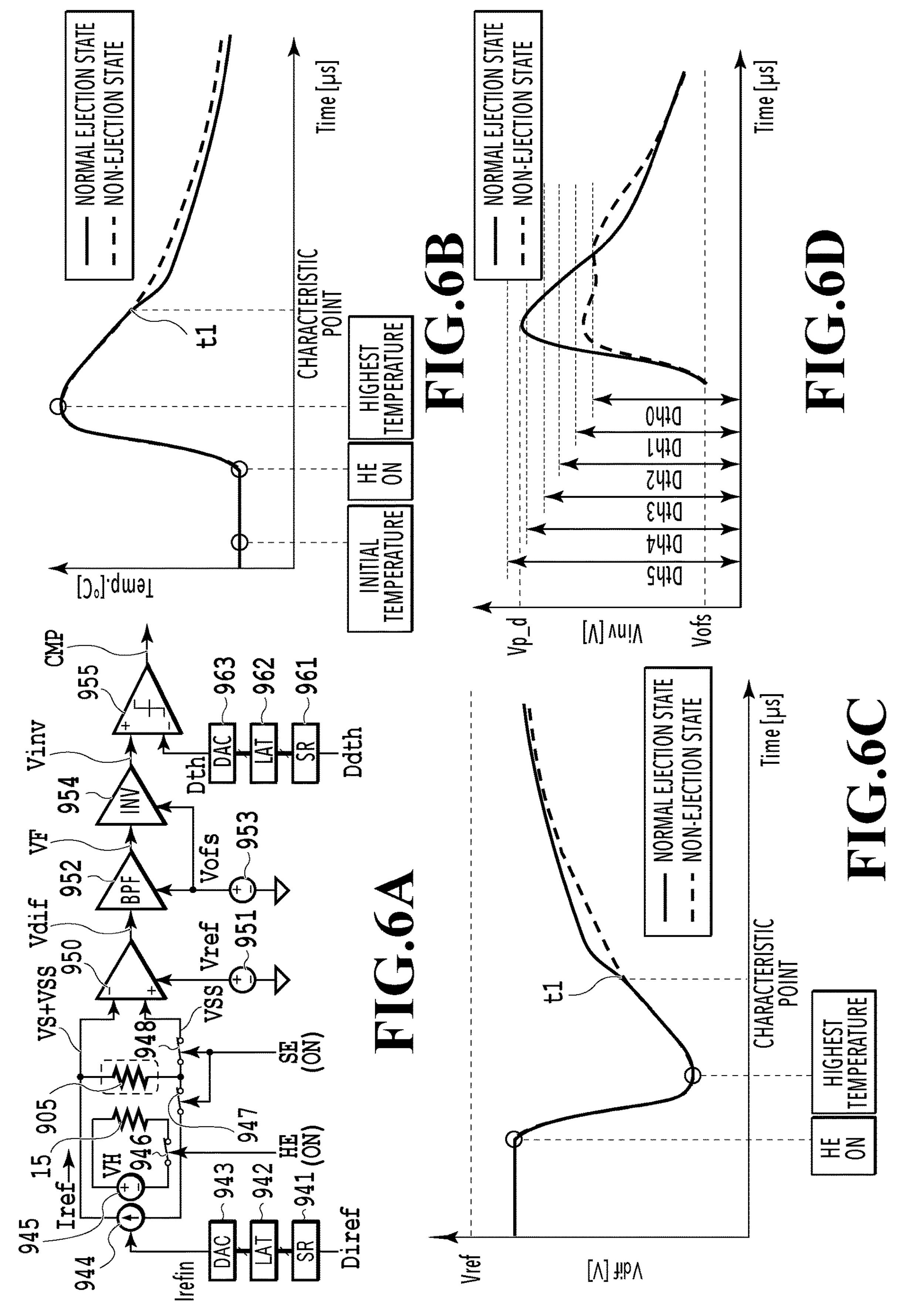
FIGS. 6A to 6D are diagrams showing an electric circuit and temperature profiles.

FIG. 6A is a diagram showing an overview of a temperature detection process and a print head status determination process based on the temperature detected, in the present embodiment. FIG. 6B is a graph showing the profiles of temperature detected by the temperature detection element 905 upon application of a drive voltage to the heater 15 in a normal ejection state in which ink is normally ejected from the ejection port and a non-ejection state in which ink is not ejected.

As shown in FIG. 6A, the heater 15 is connected to a constant voltage source 945 and a switch element 946. Once a heater drive signal HE becomes ON (High active), the switch element 946 closes, applying a constant voltage VH to the heater 15. Meanwhile, once the heater drive signal HE becomes OFF (Low), the switch element 946 opens, shutting off the application of the constant voltage VH to the heater 15. In this way, the constant voltage VH is applied to the heater 15 in the form of rectangular pulses depending on the heater drive signal HE is ON or OFF.

Meanwhile, the temperature detection element 905 is formed of a thin-film resistor and is connected to a constant current source 944 and switch elements 947, 948. Once a sensor selection signal SE becomes ON (High active), the switch elements 947, 948 close, applying a constant current Iref from the constant current source 944 to the temperature detection element 905. At the same time, a voltage signal across the temperature detection element 905 is inputted to a differential amplifier 950. Meanwhile, once the sensor selection signal SE becomes OFF (Low), the switch elements 947 and 948 open, shutting off both the application of the constant current Iref to the temperature detection element 905 and the input of the voltage signal across the temperature detection element 905 to the differential amplifier 950.

For example, the constant current Iref can be set in 32 stages with 0.1-mA increments between 0.6 mA to 3.7 mA. Hereinafter, a set width in one stage is called one rank. For the range of 32 ranks, a set value Diref for the constant current Iref is defined as a 5-bit digital value. This set value Diref is transferred to the shift register 941 in synchronization with a clock signal (not shown). Then, the set value Diref is latched by the latch circuit 942 at the timing of a latch signal (not shown) and is outputted to the current-output-type digital-to-analog converter (DAC) 943.

The output signal from the latch circuit 942 is held until the next latch timing, and in the meantime, the next set value Diref is transferred to the shift register 941. An output current Irefin from the digital-to-analog converter (DAC) is inputted to the constant current source 944 and is outputted as the constant current Iref after being amplified, for example, 12-fold.

A resistance value Rs of the temperature detection element 905 at a temperature T changes depending on a temperature change in accordance with the amount of heat generated by the temperature detection element 905. More specifically, the resistance value Rs of the temperature detection element 905 is expressed by the following Formula 1:

$$Rs = Rs0\{1+\mathrm{TCR}(T-T0)\} \quad \text{(Formula 1)}$$

where T0 is a room temperature, Rs0 is a resistance value at the room temperature T0, and TCR is a temperature resistance coefficient for the temperature detection element 905.

Once the constant current Iref is applied to the temperature detection element 905, a differential voltage VS is generated across the temperature detection element 905. This differential voltage VS is expressed by the following Formula 2:

$$VS = I\mathrm{ref} \cdot Rs = I\mathrm{ref} \cdot Rs0\{1+\mathrm{TCR}(T-T0)\}. \quad \text{(Formula 2)}$$

The differential voltage VS is inverted and inputted to the differential amplifier 950. Then, in that state, an output voltage Vdif becomes a negative voltage equal to or below a ground voltage GND, and actually, the output voltage Vdif from the differential amplifier 950 becomes 0 V and is fed back to the negative terminal of an operational amplifier inside the differential amplifier 950. In this case, an unexpected signal would be outputted from the differential amplifier 950. To avoid this, an offset voltage Vref which is sufficient to make the output Vdif reach or exceed the ground voltage GND is applied from a constant voltage source 951 to the differential amplifier 950.

FIG. 6C shows the profiles of the output voltage Vdif from the differential amplifier 950, corresponding to the temperature profiles in FIG. 6B. In FIG. 6C, the solid line denotes a profile of the output voltage Vdif in the normal ejection state, and the broken line denotes a profile of the output voltage Vdif in the non-ejection state. The waveforms of the output voltage Vdif shown in FIG. 6C are inverted upside down from the temperature waveforms. In other words, the detection temperature is low in a case where the output voltage Vdif is high, and the detection temperature is high in a case where the output voltage Vdif is low. Thus, in each waveform in FIG. 6C, a portion with a negative slope represents a temperature rise process, and a portion with a positive slope represents a temperature drop process.

As shown in FIGS. 6B and 6C, in the normal ejection state, a characteristic point t1 appears, where the temperature of the heater 15 drastically drops. This is because in the normal ejection state, a part of an ejected droplet falls onto the heater 15 due to contraction of a bubble after the bubble is generated and consequently decreases the temperature of the heater 15. In the non-ejection state, by contrast, no droplet falls onto the heater 15, and therefore the temperature changes gently, causing no characteristic point to appear.

The output voltage Vdif of the differential amplifier 950 showing such a change is next inputted to a filter circuit 952. The filter circuit 952 is a circuit for converting the maximum gradient at the temperature drop of the output voltage Vdif from the differential amplifier 950 into a peak value. This filter circuit 952 is formed by a band-pass filter (BPF) 952 having a secondary low-pass filter and a primary high-pass filter that are cascade-connected to each other. The low-pass filter of the band-pass filter 952 attenuates high-frequency noise which is on the higher side than a cutoff frequency fcL, and the high-pass filter extracts a gradient at the temperature drop by performing first-order differentiation on frequencies lower than a cutoff frequency fcH, and removes a direct-current component. As a result of this signal processing by the filter circuit 952, the filter circuit 952 outputs a signal VF which serves as the basis for a signal Vinv for determining whether the print head 3 is in a normal ejection state or in a non-ejection state.

Note that because this signal VF too might become a negative voltage equal to or below the ground voltage GND, as described earlier, an offset voltage Vofs which is sufficient to make the signal VF reach or exceed the ground voltage GND is applied from a constant voltage source 953 to the positive terminal of the filter circuit 952.

Because signals with lower frequencies have been attenuated by the high-pass filter to decrease the output voltage, the output signal VF from the filter circuit 952 is amplified by an inversion amplifier (INV) 954 which is an output unit provided at a later stage. Because the inversion amplifier 954 inverts the inputted signal VF which is a positive voltage and makes the inputted signal VF a negative voltage, an offset voltage is applied to increase the voltage of the output signal Vinv, as with the filter circuit 952.

In this event, an output from the constant voltage source that applies the offset voltage Vofs to the filter circuit 952 is branched off to apply the same offset voltage Vofs to the inversion amplifier 954 as well. As a result, the output signal Vinv from the inversion amplifier 954 is as expressed by the following Formula 3:

$$Vinv = Vofs + Ginv(Vofs - VF) \quad \text{(Formula 3)}$$

where Ginv is the rate of amplification by the inversion amplifier 954.

FIG. 6D shows profiles of the signal Vinv outputted from the inversion amplifier 954 with the print head 3 being in the normal ejection state and in the non-ejection state. In the normal ejection state, a peak voltage Vp appears, which is attributable to the maximum temperature drop rate after the characteristic point t1. Meanwhile, in the non-ejection state, because no characteristic point t1 appears, the temperature drop rate is slow, and the peak voltage Vp appearing in the waveform is smaller than that in the normal ejection state.

The output signal Vinv from the inversion amplifier 954 is inputted to the positive terminal of a comparator 955. The comparator 955 compares the output signal Vinv inputted to the positive terminal with a threshold voltage Dth inputted to the negative terminal, and outputs a determination signal CMP which is effective in a case where Vinv>Dth. In this way, the comparator 955 has a function as a determination unit that determines the ejection state of the print head 3.

For example, the threshold voltage Dth can be set in the range of 256 ranks, with 8-mV increments between 0.5 V to 2.54 V. For the range of 256 ranks, a set value Ddth for the threshold voltage Dth can be expressed as a 8-bit digital value. This set value Ddth is transferred to a shift register (SR) 961 in synchronization with a clock signal (not shown). Then, the output from the shift register 961 is latched by the latch circuit 962 at the timing of a latch signal (not shown) and then outputted to a voltage-output-type digital-to-analog converter (DAC) 963. The output signal from the latch circuit 962 is held until the next latch timing, and in the meantime, the next set value Ddth is transferred to the shift register 961.

The peak voltage Vp of the output voltage Vinv from the inversion amplifier 954 is detected using the comparator 955 in the procedure described below. First, in the first latch period of the latch circuit 942, a constant current Iref0 (e.g., 1.6 mA) is applied to the temperature detection element 905, the constant current Iref0 corresponding to a reference set value Diref0 transferred to the shift register 941 connected at the constant current source 944 side. Then, in this state, a pulsed application voltage (hereinafter also referred to as a drive pulse) is applied to the heater 15. Note that the application of the drive pulse to the heater 15 is performed by turning on and off of the switch element 946 connected to the constant voltage source 945. In this event, a reference set value Ddth0 corresponding to the threshold voltage Dth0 serving as a reference is inputted to the comparator 955 to be compared with the peak voltage Vp of the output voltage Vinv from the inversion amplifier 954. Then, once the comparator 955 outputs a determination pulse CMP, the rank of Dth is raised by one for the next latch period, and the comparison with the peak voltage of the output voltage Vinv from the inversion amplifier 954 is similarly performed.

The above operation is repeated until the determination pulse CMP is not outputted from the comparator 955, and the last rank of the threshold voltage Dth at which the determination pulse CMP was outputted is set as the peak voltage Vp. For example, in order to detect the peak voltage Vp in the normal ejection state shown in FIG. 6D, as the threshold voltage is raised gradually from Dth0 to Dth1, Dth2, and so on, CMP is not outputted at Dth5, and thus, Dth4, which is the threshold voltage at which CMP was outputted last, is set as Vp1 (a first output value).

Meanwhile, in a case where the determination pulse CMP is not outputted in the first latch period, the rank of Dth is lowered by one for the next latch period, and the comparison with the peak of Vinv is similarly performed. This is repeated until the determination pulse CMP is outputted, and the rank of Dth at which the determination pulse CMP was outputted is set as a peak voltage Vp. In the example of normal ejection in FIG. 6D, the threshold voltage is lowered gradually to Dth5, Dth4, and so on, and because CMP is outputted at Dth4, Dth4 is set as Vp.

Here, in a case where energy not reaching the minimum ejection enabling energy is applied to the heater 15, bubble generation caused by the heater 15 is insufficient, causing the non-ejection state where no droplet is ejected. By contrast, in a case where the application energy applied to the heater 15 reaches the minimum ejection enabling energy, the force of bubble generation enables a droplet to be ejected.

Figure 7A:
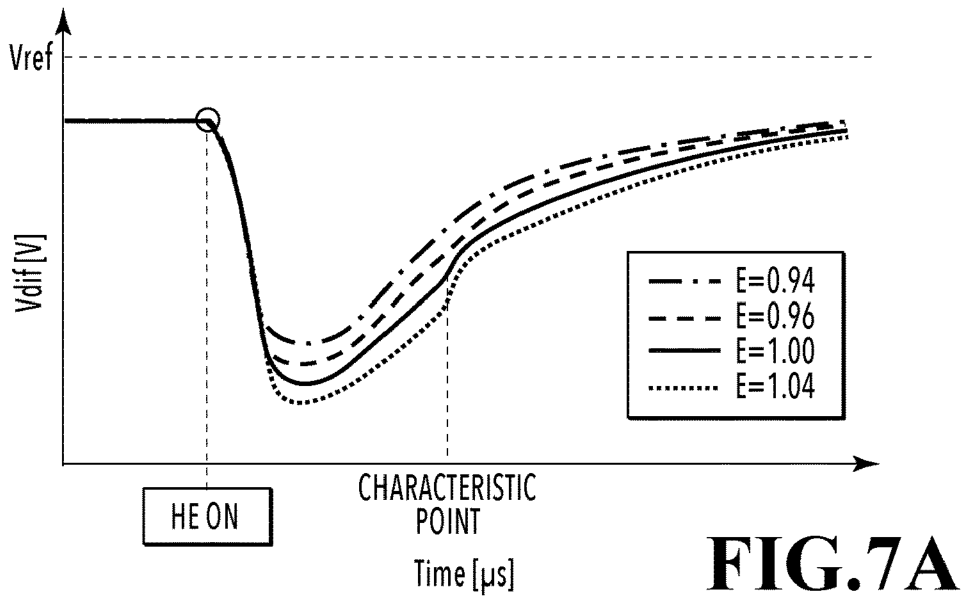
FIGS. 7A to 7C are diagrams showing outputs from a differential amplifier and the relation between application energy and a peak voltage.
Figure 7B:
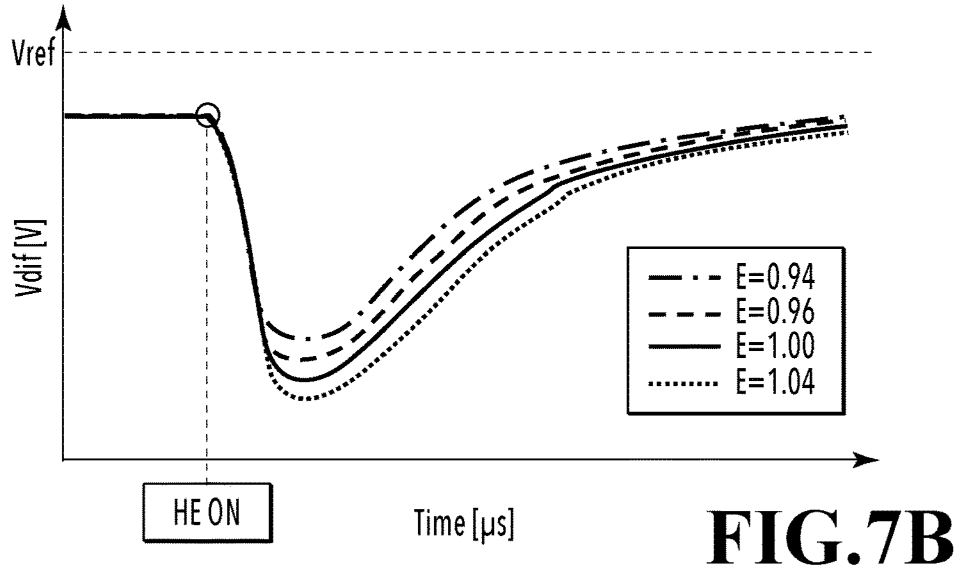

FIG. 7A shows a change in the output voltage Vdif from the differential amplifier 950 caused by a change in the application energy applied to the heater 15. FIG. 7B shows a change in Vdif caused by a change in the application energy in a constant non-ejection state which is forcibly created by attachment of a tape to the surface of the ejection port 13. Note that the application energy is defined as follows: ink is actually ejected to a sheet of paper, and the minimum energy (the minimum ejection enabling energy) with which print was confirmed is defined as 1 (E=1.00).

As shown in FIG. 7A, in order for liquid to be ejected from the ejection port normally, in a case where there is no ejection because the application energy is below the minimum ejection enabling energy, the energy amount is small, and therefore the highest temperature is also low. Thus, a characteristic point does not appear. With application energy of the minimum ejection enabling energy or above, the highest temperature increases, and a characteristic point appears.

Meanwhile, in the non-ejection state, a characteristic point does not appear as shown in FIG. 7B, and thus, as the application energy increases, the highest temperature simply increases.

Figure 7C:
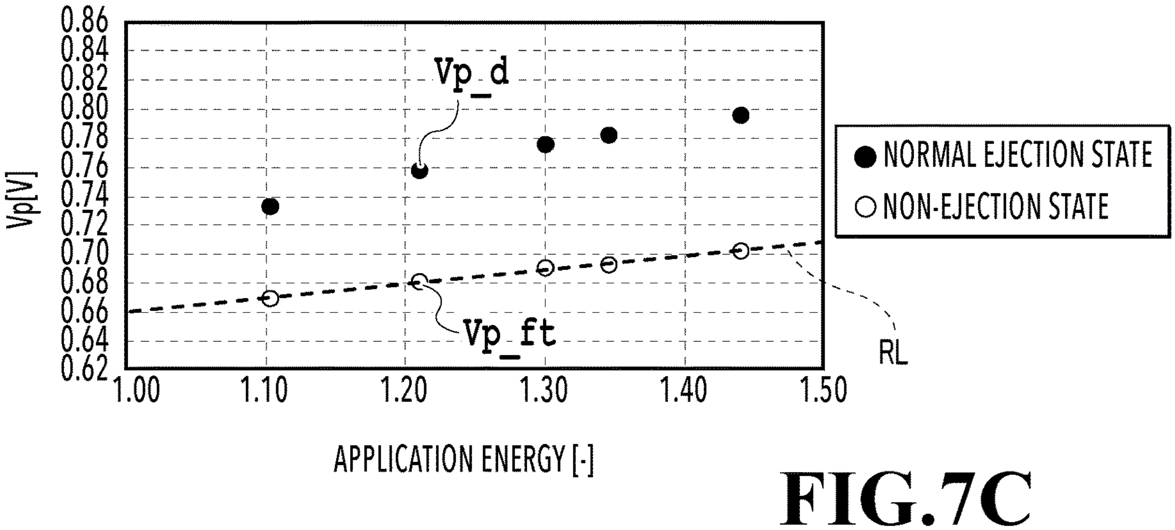

FIG. 7C shows a change in the peak voltage Vp of Vinv in a case where the application energy is changed from E=1.10 to 1.44 for each of the normal ejection state and the non-ejection state described above. Note that in FIG. 7C, the black dots denote the peak voltages for the normal ejection state (a first output value Vp_d), and the white dots denote the peak voltages for the non-ejection state (a second output value Vp_ft).

As shown in FIG. 7C, in both of the normal ejection state and the non-ejection state, as the application energy increases, the peak voltage Vp increases as well. This is because in the normal ejection state, as the application energy increases, the highest temperature increases as well, and the heater temperature is high at the timing at which a tail of an ejected droplet falls onto the heater 15, the tail consequently contributing to an increase in the rate of temperature drop of the heater 15. The non-ejection state is similar to the normal ejection state except that there is no ejected droplet falling on the heater 15. As the application energy increases, the highest temperature increases, and the temperature drop speed increases gently. Thus, as the application energy increases, Vp increases as well. Especially in the non-ejection state, the peak voltage Vp (a second output (Vp2)) increases almost monotonically relative to the application energy, and is distributed almost linearly as shown in FIG. 7C. The dotted line RL in FIG. 7C is a regression line calculated using the method of least squares based on the relation between the application energy E and the peak voltage Vp, which is measured in advance in the non-ejection state. As can be seen in FIG. 7C, in the non-ejection state, the peak voltages Vp outputted upon application of the respective values of ejection energy E to the heater 15 are distributed on the regression line described above. Thus, the dotted line RL in FIG. 7C is a regression line found based on the relation between each output value of the peak voltage Vp and a value of energy used to achieve the output value, which is measured in advance in the non-ejection state.

Utilizing such nature, the present disclosure sets the threshold voltage Dth by estimating the peak voltage Vp in the non-ejection state and thus making it less likely for the accuracy of ejection failure detection to be low even with variability in sensor sensitivity.

As described earlier, the ejection state of the print head 3 is detected by setting the threshold voltage Dth between the peak voltage Vp in the normal ejection state and the peak voltage Vp in the non-ejection state and comparing the threshold voltage Dth with the peak voltage Vp outputted upon application of application energy for performing an ejection operation to the heater 15. Thus, unless the threshold voltage Dth is set to a proper value between the peak voltage Vp in the normal ejection state and the peak voltage Vp in the non-ejection state, the accuracy of ejection state detection will be low. Note that in the description below, application energy which, by being applied to the heater 15, enables liquid to be normally ejected from an ejection port with the heater 15, its drive circuit, and the ejection port being in a state of being capable of ejecting liquid normally is referred to as ejection enabling energy.

The temperature detection element 905 and the detection circuit used for the ejection state detection have various types of manufacturing variability, and thus, the peak voltage Vp varies even with the same ejection state. For example, the peak voltage Vp varies due to variability in the temperature properties of the temperature detection element 905 itself or in the amplification factor of the inversion amplifier (INV). For this reason, it is preferable that the ejection state be detected with a proper threshold voltage Dth being set for each print element board, each ejection state detection circuit, and each print element.

However, in prior art shown in Japanese Patent Laid-Open No. 2019-171673, in the setting of the threshold voltage Dth, the threshold voltage Dth for the non-ejection state is unknown, and therefore the ejection state determination is performed by setting the threshold voltage Dth to a value lowered by a certain value from the peak voltage Vp in the normal ejection state. In this event, in a case where the certain value by which the value is lowered from the peak voltage Vp in the normal ejection state is too large or too small, the ejection state determination may fail to be determined properly.

For example, in a case where due to manufacturing variability or the like, the amplification factor of the inversion amplifier 954 or an output value from the temperature detection element 905 is smaller than a proper value, the peak voltage Vp in the normal ejection state is closer to the peak voltage Vp in the non-ejection state. In a case where the certain value by which the value is lowered from the peak voltage Vp for the normal ejection state is too large, it is possible to determine a complete non-ejection state, but there is a possibility that a state having an ejection failure, such as liquid being ejected taking a curving course or ejected at a low speed, may be determined as normal ejection.

Also, conversely, in a case where the certain value by which the value is lowered from the peak voltage Vp in the normal ejection state is too small, there is a possibility that a normal ejection state may be determined as non-ejection. Specifically, in a case where due to manufacturing variability, the amplification factor of the inversion amplifier 954 or the temperature property of the temperature detection element 905 is larger than a proper value, the peak voltage Vp increases. Thus, in a case where the certain value by which the value is lowered from the peak voltage Vp is small, even in the normal ejection state, the peak voltage Vp falls short of the threshold voltage Dth which is set based on the above certain value, which leads to normal ejection being erroneously determined as non-ejection.

For this reason, the present embodiment estimates the peak voltage Vp in the non-ejection state by using the nature of the peak voltage Vp in the non-ejection state being distributed on a regression line as described earlier. Thus, the peak voltage Vp in the ejection state and the peak voltage Vp in the non-ejection state can be known. Consequently, the difference between the peak voltage Vp in the ejection state and the peak voltage Vp in the non-ejection state can be accurately calculated, and this difference can be used to estimate the state of manufacturing variability in the target print element (heater) 15. Then, the threshold voltage Dth is set according to the manufacturing variability in the heater 15 and the like, which makes it less likely for the accuracy of ejection state determination to be low even in a case where there is manufacturing variability in the inversion amplifier 954, the temperature detection element 905, or the like.

Figure 8B:
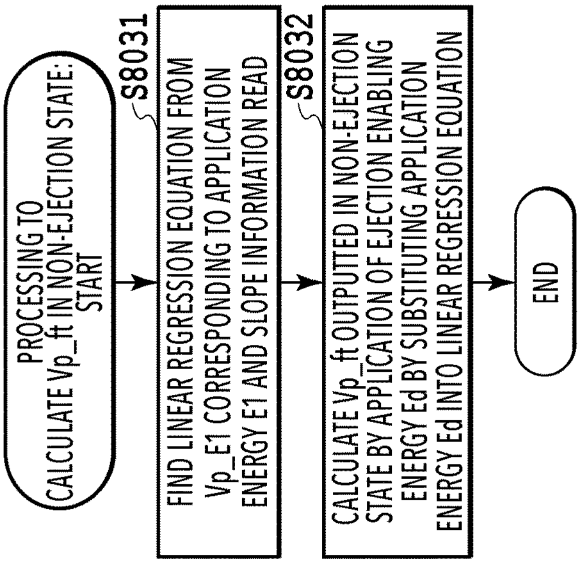
Figure 8A:
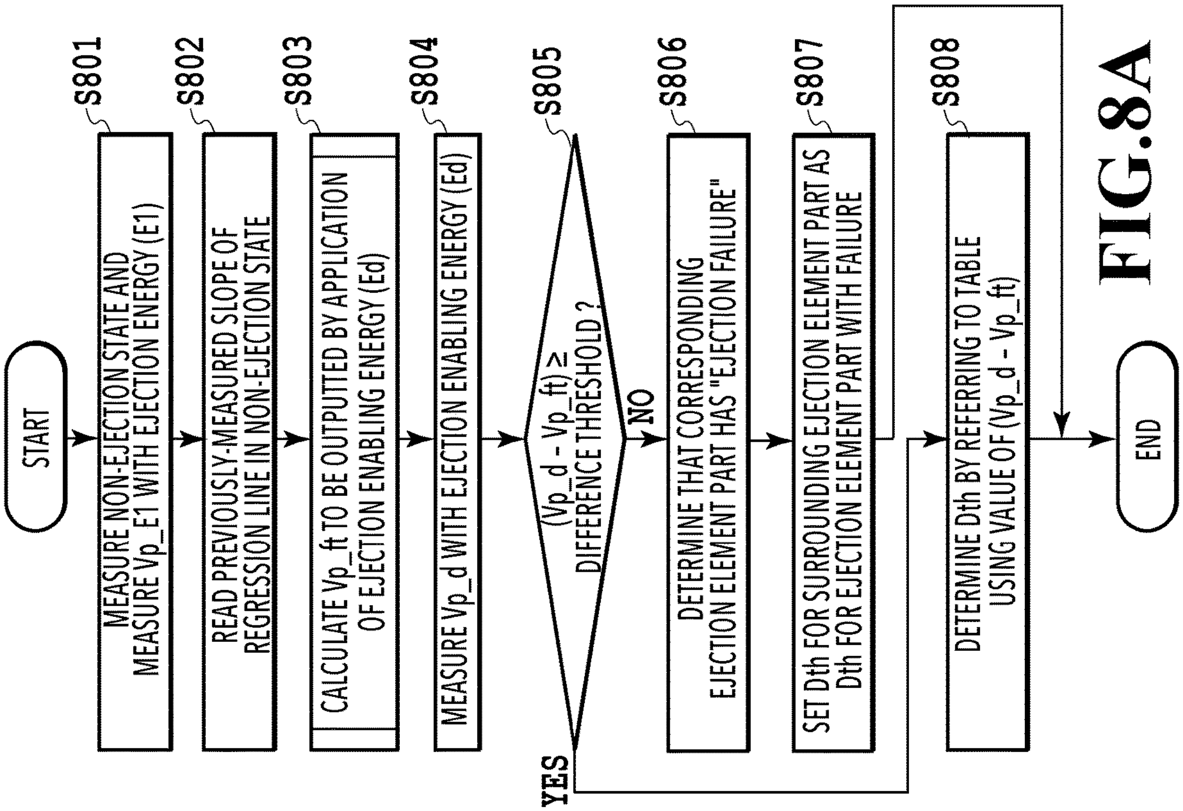

FIG. 8A is a flowchart showing a series of threshold voltage setting processing carried out in the present embodiment. The processing shown in FIG. 8A is executed by the print controller 419 of the print engine unit 417 shown in FIG. 2. Note that the letter S added to each step number in FIG. 8A denotes "Step."

In the present embodiment, in order to set the threshold voltage Dth, first, a non-ejection state is forcibly created for the target ejection port. Then, in S801, application energy applied to the heater 15 is set to any application energy E1, the application energy E1 is used to drive the heater 15, and the peak voltage Vp of an output value from the inversion amplifier 954 is measured. The application energy E1 used here is also called second energy to be contrasted with first energy to be described later. The measurement of this peak voltage Vp is performed as described earlier. Specifically, while changing the threshold voltage Dth inputted to the negative terminal of the comparator 955, the threshold voltage Dth is compared with the output signal Vinv outputted from the inversion amplifier 954, and the threshold voltage at which the determination signal CMP is outputted is set as a peak voltage. Hereinbelow, the peak voltage Vp outputted from the inversion amplifier 954 upon application of the application energy E1 to the heater 15 is denoted as Vp_E1.

The non-ejection state may be created with any method as long as a tail of an ejected droplet does not fall onto the heater 15. For instance, the ejection port 13 may be covered up, or the surface of the ejection port 13 may be filled with a large amount of ink. Examples of the method for covering up the surface of the ejection port 13 include attaching a tape to the ejection port as described above or bringing a film, rubber, resin, or the like into close contact with the surface of the ejection port 13 to cover it. Examples of the method for filling the surface of the ejection port 13 with a large amount of ink include covering the print element board 10 with a cap which is made of resin, rubber, or the like and is filled inside with liquid such as ink, cleaning liquid, or the like.

After the measurement of the peak voltage Vp_E1, through S802 and S803, processing is performed to calculate (estimate) a peak voltage Vp (Vp_ft) outputted upon application of ejection enabling energy Ed for actually determining the ejection state to the heater 15 in the non-ejection state. This ejection enabling energy Ed is also referred to as first energy. In other words, processing to calculate the peak voltage Vp (Vp_ft) estimated to be outputted assuming the first energy is applied to the heater 15 in the non-ejection state is performed through S802 and S803. What is needed to calculate the peak voltage Vp (Vp_ft) is, as described earlier, the slope of a regression line indicating the relation between the application energy E and the peak value Vp in the non-ejection state. To this end, first in S802, information on the slope of a regression line is read. Next in S803, a regression line is calculated using the slope previously read and the peak voltage Vp_E1 measured in S801. Then, also in S803, this regression line is used to calculate (estimate) the peak voltage Vp (Vp_ft) to be outputted assuming the first energy is applied to the heater 15 in the non-ejection state. Note that as the regression line slope information, a value measured in advance is saved in a storage region such as EEPROM in the print head 3 or a storage region in the inkjet printing apparatus 1000. The measurement of the regression line slope can be performed at the time of, for example, manufacturing of the print head 3. Alternatively, at the start of use of the inkjet printing apparatus 1000, the measurement can be performed on the printing apparatus 1000. In either case, the measurement of the slope is done prior to the processing shown in the flowchart in FIG. 8A.

FIG. 8B shows processing executed in S803 to calculate the peak voltage Vp_ft to be outputted assuming the first energy is applied to the heater 15 in the non-ejection state. First, a linear regression equation is calculated from the slope of a regression line and the peak voltage Vp_E1 actually measured upon application of the second energy to the heater 15 (S8031). Next, the ejection enabling energy Ed (the first energy) for actually determining the ejection state is substituted into the equation calculated above to calculate (estimate) the peak voltage Vp_ft in the non-ejection state (S8032).

After the estimation of the peak voltage Vp_ft in the non-ejection state, the processing proceeds back to the flowchart shown in FIG. 8A again to execute the processing in S804. In S804, what has been covering up the ejection port, such as a tape, is removed to bring the ejection port into a state of being capable of ejection, the heater 15 is driven by the first energy Ed described above, and a peak voltage Vp_d outputted from the inversion amplifier 954 is measured. Next, in S805, the difference between the peak voltage Vp_d measured in S804 and the peak voltage Vp_ft in the non-ejection state calculated (estimated) in S803 is found. Then, this difference is compared with a predetermined difference threshold to determine whether an ejection failure such as non-ejection is occurring at the corresponding ejection element part. Specifically, because the difference is small in a case where an ejection failure such as non-ejection is occurring, the present embodiment compares the difference with the predetermined difference threshold and determines that the ejection element part is in a state of being capable of ejection and is therefore performing ejection in a case where the difference is equal to or greater than the difference threshold. Meanwhile, the present embodiment determines that an ejection failure is occurring at the ejection element part in a case where the difference is below the difference threshold. In a case where it is determined that an ejection failure is occurring, the peak voltage Vp in the normal ejection state cannot be obtained in this state, and thus, it is impossible to properly set the determination threshold voltage Dth for determining the ejection state. For this reason, the setting of a threshold for the ejection element part having an ejection failure is performed using the threshold voltage Dth for a different ejection element part.

If it is determined in S805 that liquid is being ejected, in the present embodiment, the threshold voltage Dth is determined using a reference table which is prepared in advance and has a plurality of combinations of the difference (Vp_d−Vp_ft) and the threshold voltage Dth.

FIG. 8C shows the reference table provided in the present embodiment. The table in FIG. 8C is set so that the value of Dth, which is obtained by adding a certain number to the value of Vp_ft, may fall between Vp_d and Vp_ft.

Because the difference between Vp_d in the ejection state and Vp_ft in the non-ejection state which is set accurately based on the regression line is calculated in this way, it is possible to accurately estimate the state of manufacturing variability of the temperature detection element corresponding to the target print element. Specifically, in a case where the difference between Vp_d and Vp_ft is small, it is possible to estimate that Vp's sensitivity to a temperature change is low due to manufacturing variability, and in a case where the difference is large, it is possible to estimate that Vp's sensitivity to a temperature change is high. Setting the threshold voltage Dth according to the estimated variability of the print element can make it less likely for the accuracy of the ejection state detection to be low even in a case where there is manufacturing variability in the inversion amplifier (INV), the temperature detection element 905, or the like.

Note that, to estimate the peak voltage Vp_ft to be outputted by the ejection enabling energy Ed (the first energy) in the non-ejection state, the present disclosure uses not the ejection enabling energy Ed (the first energy) which is actually used, but the ejection enabling energy E1 (the second energy). The merits of this approach are described below. In general, after some time of using the print head 3, ink may be burnt and stick to the heater 15, or the anti-cavitation film 910 may wear out. Then, even with the same energy applied, the amount of heat transmitted from the heater 15 to ink changes. Because the amount of heat transmitted to ink is important in ink ejection, it is necessary to change the energy to apply so that a proper amount of heat may be transmitted to ink at all times. In changing the energy as described above, the peak voltage Vp_ft to be outputted in the non-ejection state by newly-set energy can be estimated from the output Vp_E1 obtained by the previous energy and the slope of a regression line. Thus, there is a merit of being able to omit the measurement of the peak voltage Vp_ft outputted by the newly-set energy.

Second Embodiment

Next, a second embodiment of the present disclosure is described. The second embodiment described below enables the measurement of the peak voltage Vp_E1 in the first embodiment to be carried out in a simpler way. In the first embodiment, in measurement of the peak voltage Vp_E1, a non-ejection state is created forcibly by, e.g., covering up the surface of the ejection port 13. However, this requires a mechanical action of covering up the ejection ports 13 and therefore takes time for the measurement. Thus, the second embodiment makes it possible to measure the peak voltage Vp_E1 without performing a mechanical action. Specifically, a non-ejection state is created by setting the ejection enabling energy to a value below the minimum ejection enabling energy, and this allows Vp_E1 to be measured in a shorter time.

Figure 9A:
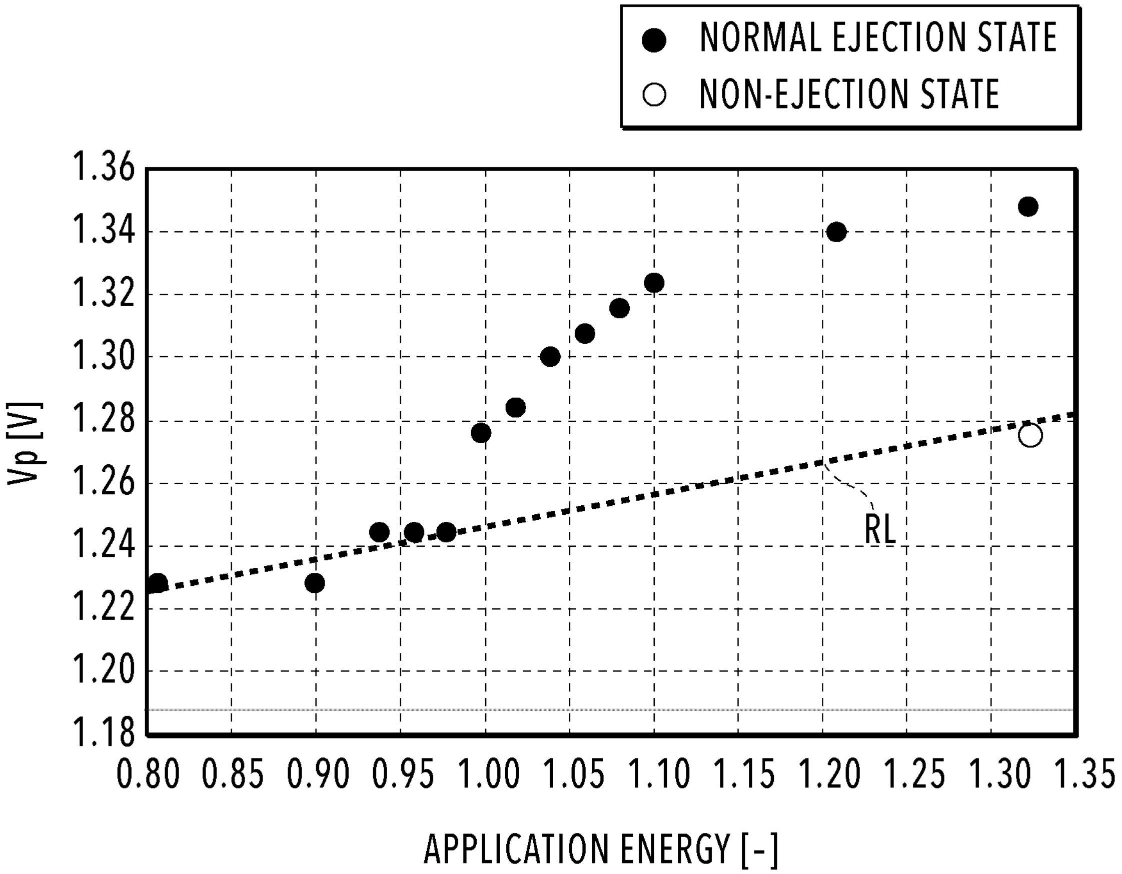
FIGS. 9A and 9B are a diagram showing the relation between application energy and a peak voltage and a flowchart showing processing in a second embodiment.
Figure 9B:
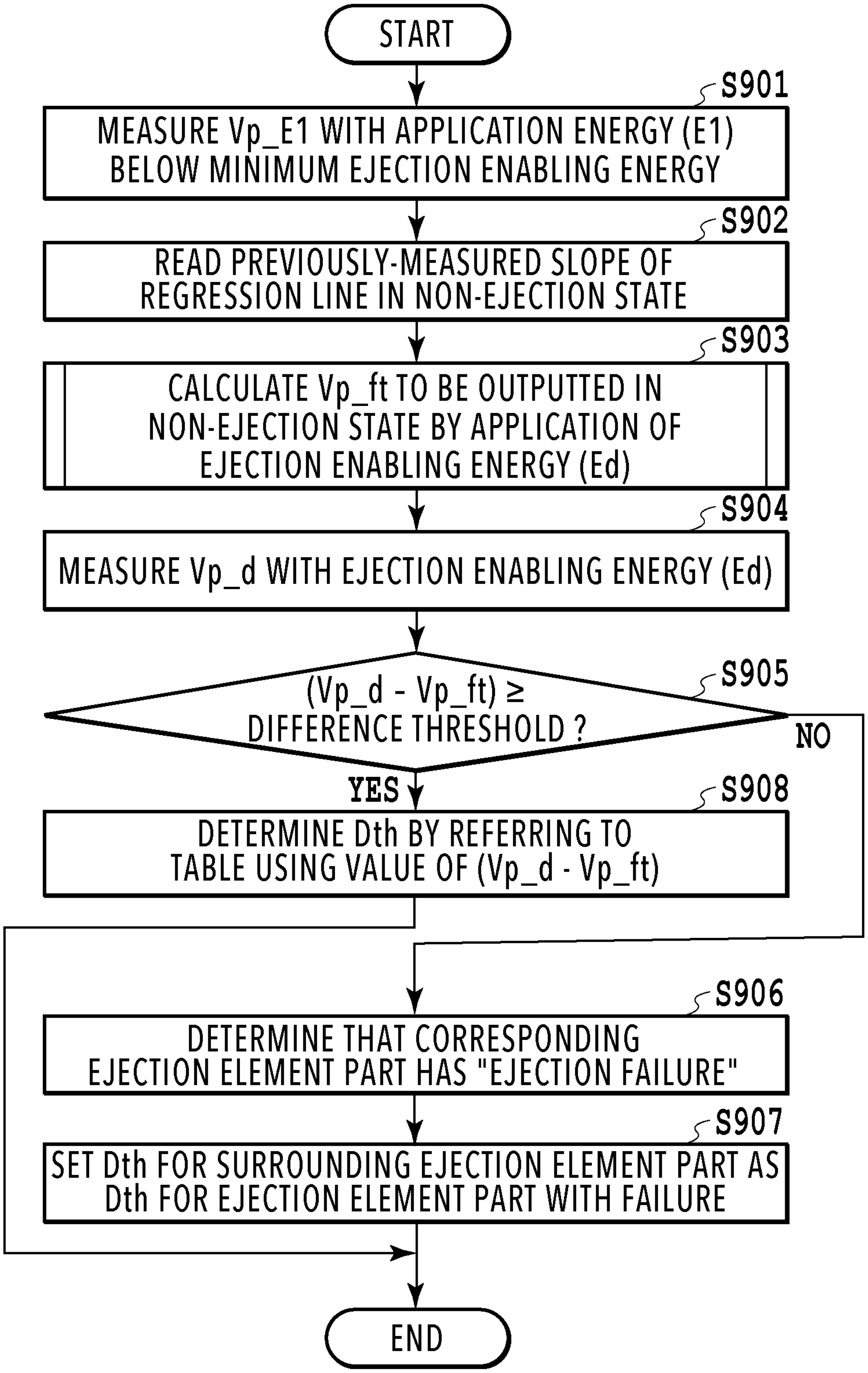

FIGS. 9A and 9B show an overview of the second embodiment. FIG. 9A is a diagram showing the relation between the application energy E applied to the heater 15 and the peak voltage Vp outputted from the inversion amplifier 954. This example shows results of measurement of the peak voltages Vp outputted upon application of the application energy E=0.81 to 1.32 in a print head 3 different from the print head 3 in the first embodiment. Note that the peak voltage Vp in the non-ejection state for E=1.32 in FIG. 9A is the peak voltage Vp outputted from the inversion amplifier 954 in a non-ejection state forcibly created by attachment of a tape to the surface of the ejection port 13.

As described above, in a case where the application energy E is below the minimum ejection enabling energy (E<1.00), the print head 3 is in a non-ejection state. For this reason, no characteristic point appears on the voltage Vdif outputted from the inversion amplifier 954, and therefore, the amount of change of the peak voltage Vp relative to the ejection enabling energy E is small, as shown in FIG. 9A. By contrast, in a case where E is equal to or above 1.00 which is a point of change into the ejection state, the peak voltage Vp is greatly changed.

Also, the broken line RL in FIG. 9A is a regression line calculated using the method of least squares, based on the peak voltage Vp and the application energy E below the minimum ejection enabling energy (E<1.00). The peak voltage Vp for E=1.32 in the non-ejection state is also almost on the regression line RL. The reason why the peak voltage Vp in the non-ejection state is on the regression line RL is because in the non-ejection state, the highest temperature increases due to an increase in the ejection enabling energy, but no characteristic point appears like in a case where the ejection enabling energy is below 1 and does not cause ink to be ejected. In other words, the reason is because the temperature drop rate increases only little by little. In this way, regarding the peak voltage Vp in the non-ejection state, the temperature drop rate and the ejection enabling energy E almost have a proportional relation with each other irrespective of whether the application energy is below the minimum ejection enabling energy or equal to or above the minimum ejection enabling energy. Thus, the peak voltage in the non-ejection state can be expressed on the regression line RL calculated based on the relation between the application energy E below 1.00 and the peak voltage Vp.

Using the nature described above, the present embodiment estimates, from the peak voltage Vp for E<1.00, the peak voltage Vp to be outputted upon application of the application energy E of 1.00 or above in the non-ejection state and sets the threshold voltage Dth based on the estimated peak voltage Vp in the non-ejection state. This makes it less likely for the accuracy of ejection failure determination to be low even in a case where there is sensitivity variability in the temperature detection element 905 or its drive circuit.

FIG. 9B is a flowchart showing a series of threshold voltage setting processing carried out in the second embodiment. In the second embodiment, first, application energy (E1) below the minimum ejection enabling energy is applied to the heater 15, and a peak voltage Vp (Vp_E1) is measured (S901). After the measurement of the peak voltage Vp_E1, like in the first embodiment, known regression line slope information is used to calculate a linear regression equation, and energy Ed for determining the ejection state is substituted into the calculated equation to calculate (estimate) the peak voltage Vp_ft (S902, S903).

After the calculation of the peak voltage Vp_ft, the same processing as that in S804 to S807 in the first embodiment is performed in S904 to S907 to determine whether an ejection failure such as non-ejection is occurring at the corresponding ejection element part. Then, if it is determined that ejection is being performed normally, the threshold voltage Dth corresponding to the difference (Vp_d−Vp_ft) is determined using the reference table prepared in advance.

According to the second embodiment thus described, by obtaining Vp outputted upon application of energy below the minimum ejection enabling energy, it is possible to set the threshold voltage Dth without covering up the ejection port 13.

Third Embodiment

Next, a third embodiment of the present disclosure is described with reference to the flowcharts in FIGS. 10A and 10B. In the first and second embodiments, a regression line is calculated using the slope of a regression line measured in advance, whereas in the third embodiment, the slope of a regression line is measured in the processing to set the threshold voltage Dth. Specifically, in the third embodiment, the processing in the flowcharts shown in FIGS. 10A and 10B additionally includes processing to find the slope of a regression line through measurement.

As described in the second embodiment, the broken line RL in FIG. 9A is a regression line calculated using the method of least squares, based on the relation between the peak voltage Vp and the application energy E below the minimum ejection enabling energy (E=1.00). Vp for E=1.32 in the non-ejection state is also almost on this regression line RL. Thus, the slope and equation of the regression line can be calculated from the peak voltages Vp corresponding to at least two levels of application energy.

Figure 10A:
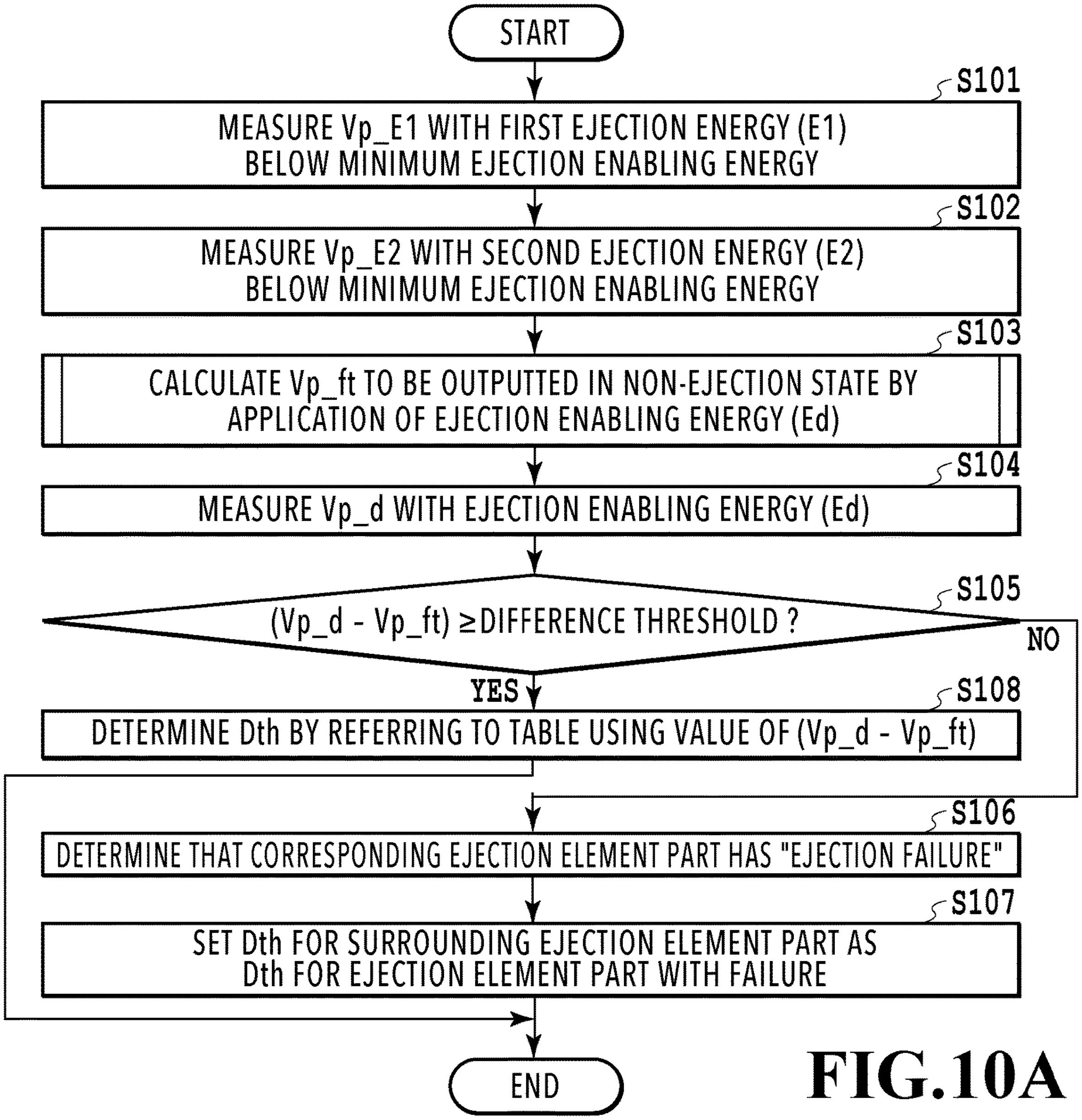
FIGS. 10A and 10B are flowcharts showing processing in a third embodiment.
Figure 10B:
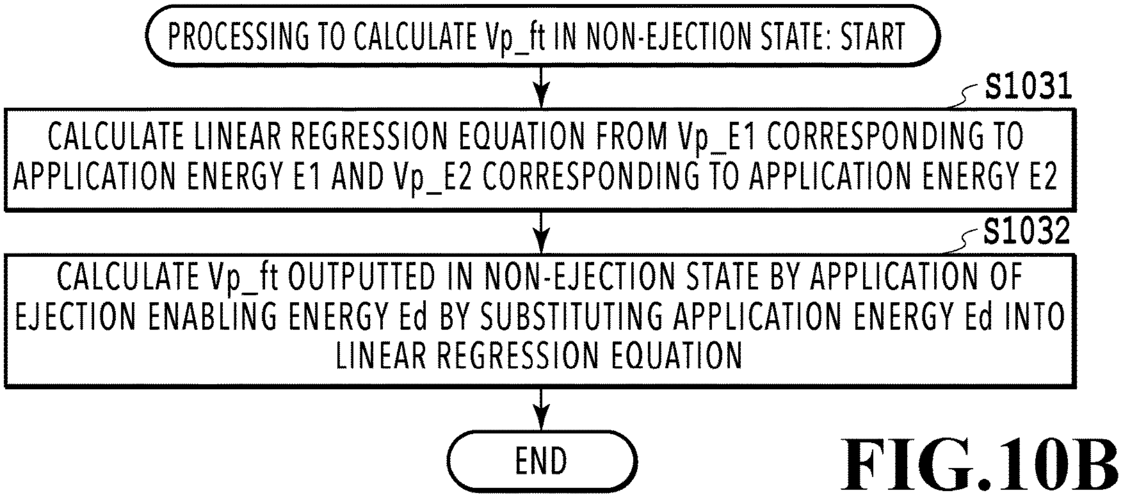

Utilizing this, the third embodiment sets the threshold voltage Dth through the processing shown in the flowcharts shown in FIGS. 10A and 10B. FIG. 10A is a flowchart showing a series of processing to set the threshold voltage Dth.

In FIG. 10A, in S101, first application energy E1 which is below the minimum ejection enabling energy is applied to the heater 15, and a peak voltage Vp (Vp_E1) is measured. Next in S102, second application energy E2 below the minimum ejection enabling energy is applied to the heater 15, and a peak voltage Vp (Vp_E2) is measured. After this, in S103, in the non-ejection state, application energy (the first energy) Ed used in determining the ejection state is applied to the heater 15, and the peak voltage Vp (Vp_ft) is calculated (estimated).

FIG. 10B is a flowchart showing processing to estimate the peak voltage Vp_ft in the non-ejection state. The peak voltage Vp_ft outputted upon application of application energy in the non-ejection state is on the regression line found from the peak voltages Vp outputted upon application of energy below the minimum ejection enabling energy as described above. Utilizing this nature, in the present embodiment, a linear regression equation is calculated from the values of the peak voltages Vp_E1 and Vp_E2 (S1031). After that, the application energy Ed used in determining the ejection state is substituted into the calculated linear regression equation, and the peak voltage Vp_ft in the non-ejection state corresponding to the application energy Ed is calculated (estimated) (S1032). After the calculation of the peak voltage Vp_ft, the processing proceeds back to the flowchart shown in FIG. 10A to execute the processing in S104 to S108. This processing in S104 to S108 is the same as the processing in S804 to S808 in the first embodiment.

Note that, as described earlier, the relation between the application energy E and the peak voltage Vp in the non-ejection state can be expressed by a regression line irrespective of whether the application energy E is ejection enabling energy or not. Although a linear regression equation is found using the relations between two levels of application energy E1, E2 below 1.00 and their corresponding peak voltages Vp (Vp_E1, Vp_E2) in the present embodiment, the present disclosure is not limited to this. For example, a non-ejection state may be forcibly created using, e.g., a method of covering up the ejection port 13 as in the first embodiment, and a regression line may be measured using the peak voltages Vp (Vp_E1, Vp_E2) corresponding to the respective levels of application energy E1, E2 that are 1.00 or above. It is also possible to set one of the two levels of application energy used for the measurement of the peak voltages to energy below the minimum ejection enabling energy and set the other one of the levels of application energy to energy equal to or above the minimum ejection enabling energy. However, the application energy equal to or above the minimum ejection enabling energy is applied after a non-ejection state is created forcibly.

In this way, the present embodiment is characterized in measuring peak voltages Vp outputted upon application of two different levels of ejection enabling energy in the non-ejection state and finding a linear regression equation from the peak voltages measured. Specific means and steps for achieving this characteristic are not limited to particular ones.

Fourth Embodiment

Figure 11:
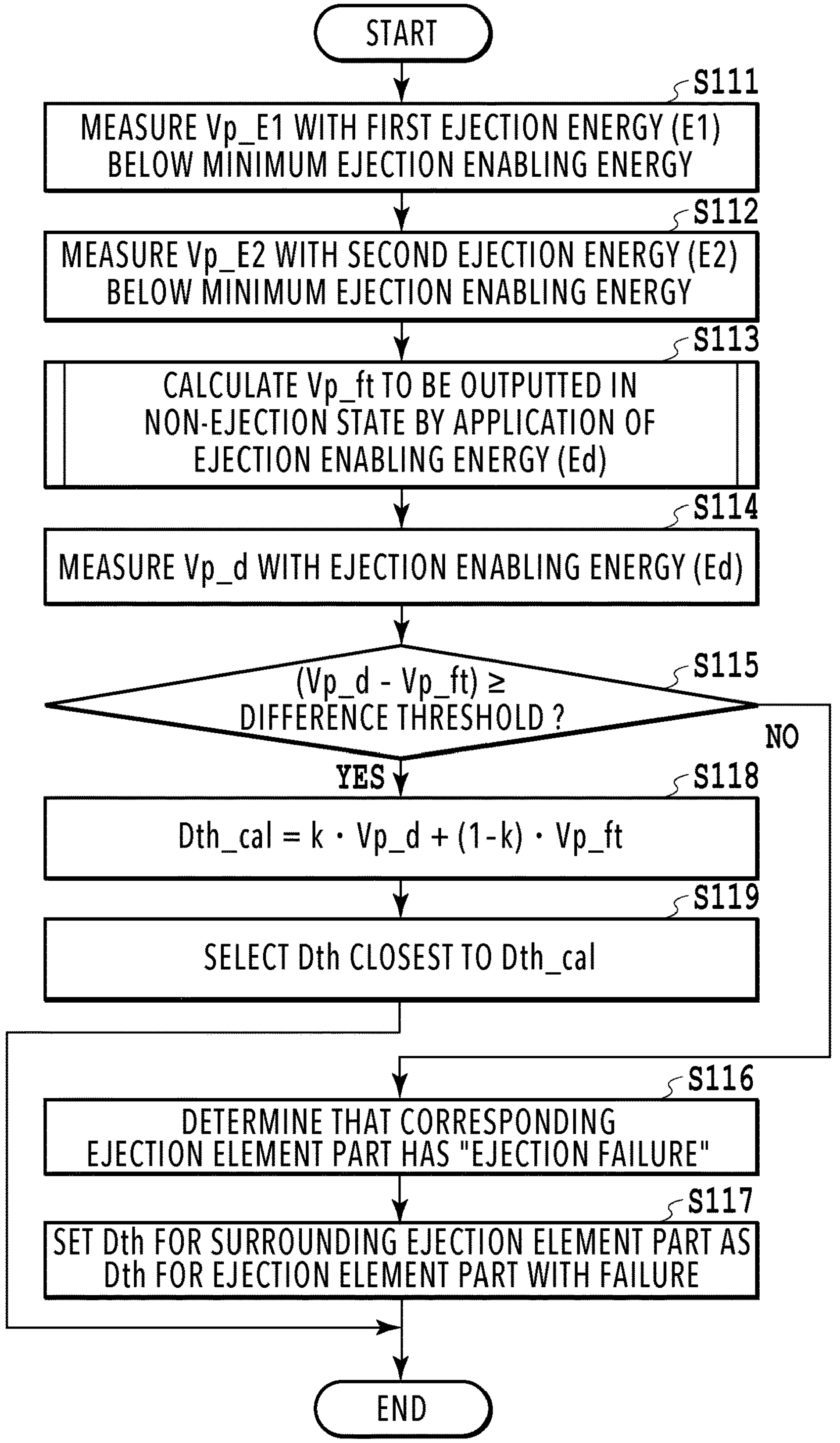
FIG. 11 is a flowchart showing processing in a fourth embodiment.

Next, a fourth embodiment of the present disclosure is described. In the examples shown in the first to third embodiments described above, the threshold voltage Dth corresponding to the difference (Vp_d−Vp_ft) between the peak voltage Vp_d in the ejection state and the peak voltage Vp_ft in the non-ejection state is determined from the reference table. By contrast, the present embodiment finds the threshold voltage Dth for determining the ejection state by performing computation shown in S118 in FIG. 11 using each of the peak voltage Vp_d and the peak voltage Vp_ft. Note that the processing in S111 to S117 in FIG. 11 is the same as the processing in S101 to S107 in the third embodiment described above, and the processing in S118 and S119 in FIG. 11 is different from the first to third embodiments. Thus, the following description mainly focuses on the processing in S118 and S119.

In the present embodiment, the processing in S118 is executed if it is determined in S115 that the difference (Vp_d−Vp_ft) between the peak voltage Vp_d in the ejection state and the peak voltage Vp_ft in the non-ejection state is equal to or above a difference threshold.

In S118, the sum of the product of the peak voltage Vp_d and a constant k where 0<k<1 and the product of the peak voltage Vp_ft and a constant (1−k) is calculated, and the calculated value is set as Dth_cal. Specifically, the following computation is performed:

$$Dth\_cal = k \cdot Vp\_d + (1-k) \cdot Vp\_ft. \quad \text{(Formula 4)}$$

The present embodiment has a reference table having threshold voltages Dth defined in 8-mV increments, like the threshold voltages Dth in the reference table in FIG. 8C. Then in S119, Dth closest to the Dth_cal calculated using Formula 4 is selected from this reference table, and this is set as a threshold voltage for ejection state determination.

In general, with too large a constant k, there is a higher possibility of normal ejection being erroneously determined as non-ejection due to measurement variability in the peak voltage Vp_d. With too small a constant k, an ejected droplet is more likely to take a curving course, and thus it is difficult to detect an ejection failure that causes a liquid droplet to be ejected at a low speed. Thus, the constant k is preferably set to a value equal to or above 0.1 and equal to or below 0.9.

Also, in a case where the temperature detection element 905 has low sensitivity to temperature change, the low sensitivity contributes to reduction in the measurement variability in the peak voltage Vp, but the difference between the peak voltage Vp_d in the ejection state and the peak voltage Vp_ft in the non-ejection state becomes small. As a result, the settable range for Dth narrows. Meanwhile, in a case where the temperature detection element 905 has high Vp's sensitivity to temperature change, the high sensitivity contributes to increase in the measurement variability in the peak voltage Vp, but the difference between the peak voltage Vp_d and the peak voltage Vp_ft becomes large as well. As a result, the settable range for the threshold voltage Dth widens. Thus, a more proper threshold voltage Dth can be set by setting the threshold voltage Dth through proportional distribution of the peak voltage Vp_d and the peak voltage Vp_ft.

In the present embodiment, Dth is set by multiplying the peak voltage Vp_d and the peak voltage Vp_ft by the constant k and the constant (1−k), respectively, as described above. This is in other words synonymous with setting Dth through the proportional distribution described above. Thus, the fourth embodiment can make it less likely for the accuracy of ejection state determination to be low due to manufacturing variability than the third embodiment described earlier does.

Fifth Embodiment

Figure 12A:
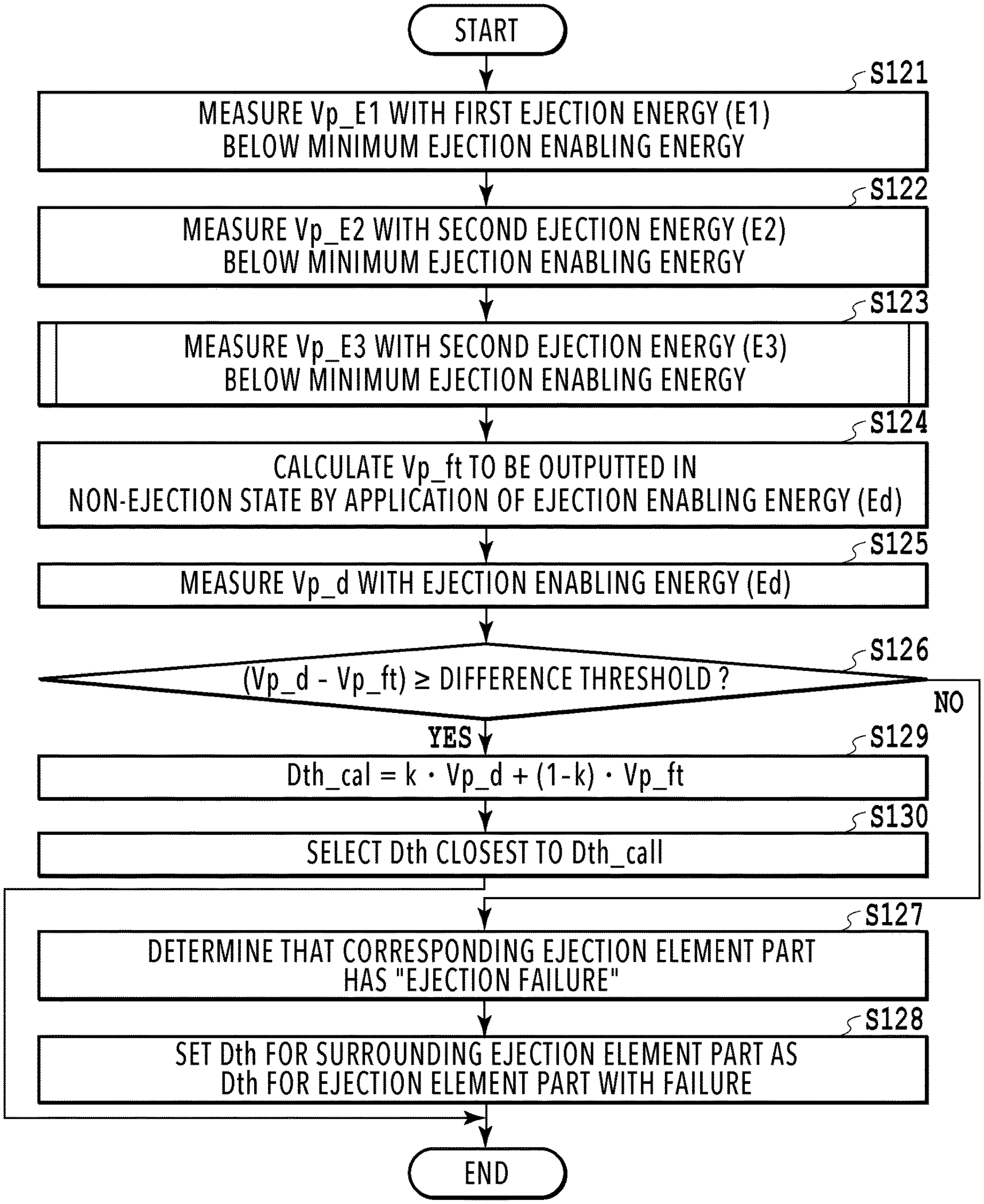
FIGS. 12A and 12B are flowcharts showing processing in a fifth embodiment.

Next, a fifth embodiment of the present disclosure is described. The third and fourth embodiments described above measure the peak voltages Vp in the non-ejection state corresponding to two levels of application energy below the minimum ejection enabling energy. By contrast, the present embodiment measures the peak voltages Vp in the non-ejection state corresponding to three levels of application energy below the minimum ejection enabling energy. The following describes threshold setting processing of the present embodiment with reference to FIGS. 12A and 12B. FIG. 12A is a flowchart showing a series of threshold voltage setting processing carried out in the present embodiment, and FIG. 12B is a flowchart showing processing to calculate (estimate) the peak voltage Vp_ft in the non-ejection state.

In S121 in FIG. 12A, first application energy E1 below the minimum ejection enabling energy is applied to the heater 15, and a peak voltage Vp (Vp_E1) is measured. Next, in S122, second application energy E2 below the minimum ejection enabling energy is applied to the heater 15, and a peak voltage Vp (Vp_E2) is measured. Further, in S123, third application energy E3 below the minimum ejection enabling energy is applied to the heater 15, and a peak voltage Vp (Vp_E3) is measured. In this way, the present embodiment measures peak voltages Vp in the non-ejection state corresponding to the respective three levels of application energy below the minimum ejection enabling energy.

Figure 12B:
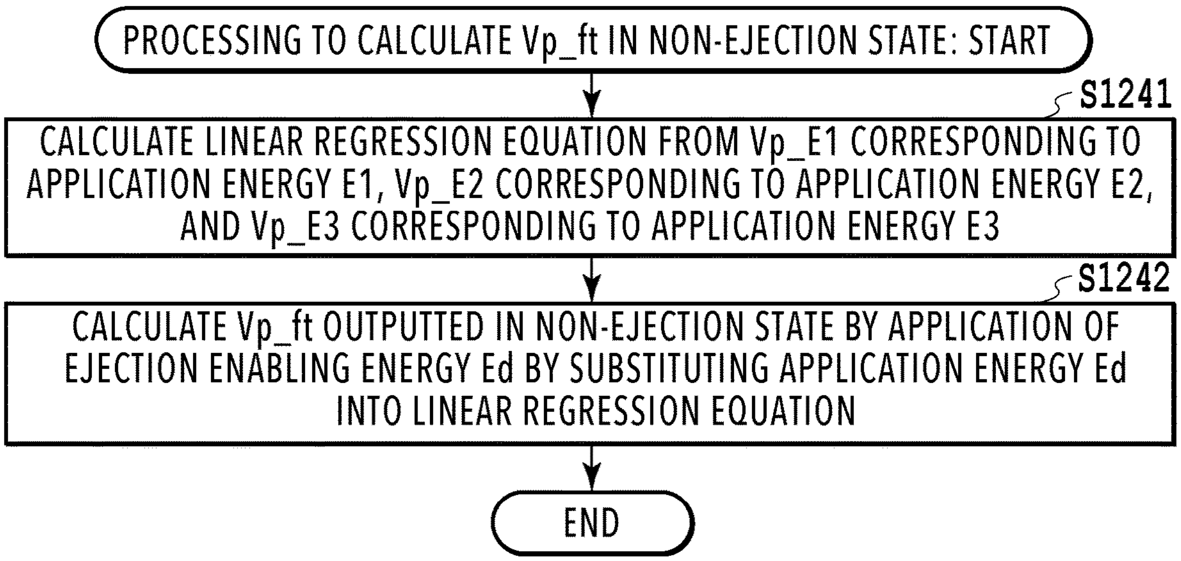

Next, in S124, processing in S1241, 1242 shown in FIG. 12B is carried out. Specifically, in S1241, a linear regression equation is calculated using the peak voltages Vp_E1, Vp_E2, Vp_E3 in the non-ejection state measured in S121 to S123. Next in S1242, the ejection enabling energy Ed is substituted into the calculated linear regression equation to calculate (estimate) the peak voltage Vp_ft in the non-ejection state to be outputted upon application of the ejection enabling energy Ed.

After that, processing in S125 to S130 shown in FIG. 12A is executed. The processing in S125 to S130 is the same as the processing in S114 to S119 described in the fourth embodiment above, and the threshold voltage Dth for ejection state determination is set using the constant k.

In the third and fourth embodiments described above, a regression line is found based on two peak voltage Vp_E1, Vp_E2 in order to estimate the peak voltage Vp_ft in the non-ejection state. For this reason, the regression line is substantially a straight line connecting two points. By contrast, in the present embodiment in which a regression line is found based on three peak voltages Vp_E1, Vp_E2, Vp_E3, the regression line differs depending on the regression method. In the present embodiment, because the values of application energy (E1, E2, E3) are substantially known, Vp_ft can be estimated with no problem using a regression line obtained by the typical method of least squares. However, in a case where the values of the application energy are presumed to be suspect, standardized major axis regression (geometric mean regression) or the like may be used.

Measuring three peak voltages Vp for the estimation of the peak voltage Vp_ft in the non-ejection state like in the present embodiment can increase the accuracy of the estimation of the peak voltage Vp_ft in the non-ejection state, compared to using two peak voltages. Then, the accurate estimation of the peak voltage Vp_ft in the non-ejection state enables the threshold voltage Dth to be set properly, which leads to further improvement in the accuracy of ejection state determination. Although three peak voltages Vp (Vp_ft) in the non-ejection state are measured in the present embodiment, it is to be noted that four or more peak voltages Vp may be measured. The more the peak voltages measured, the higher the accuracy of the ejection state determination.

OTHER EMBODIMENTS

Figure 13:
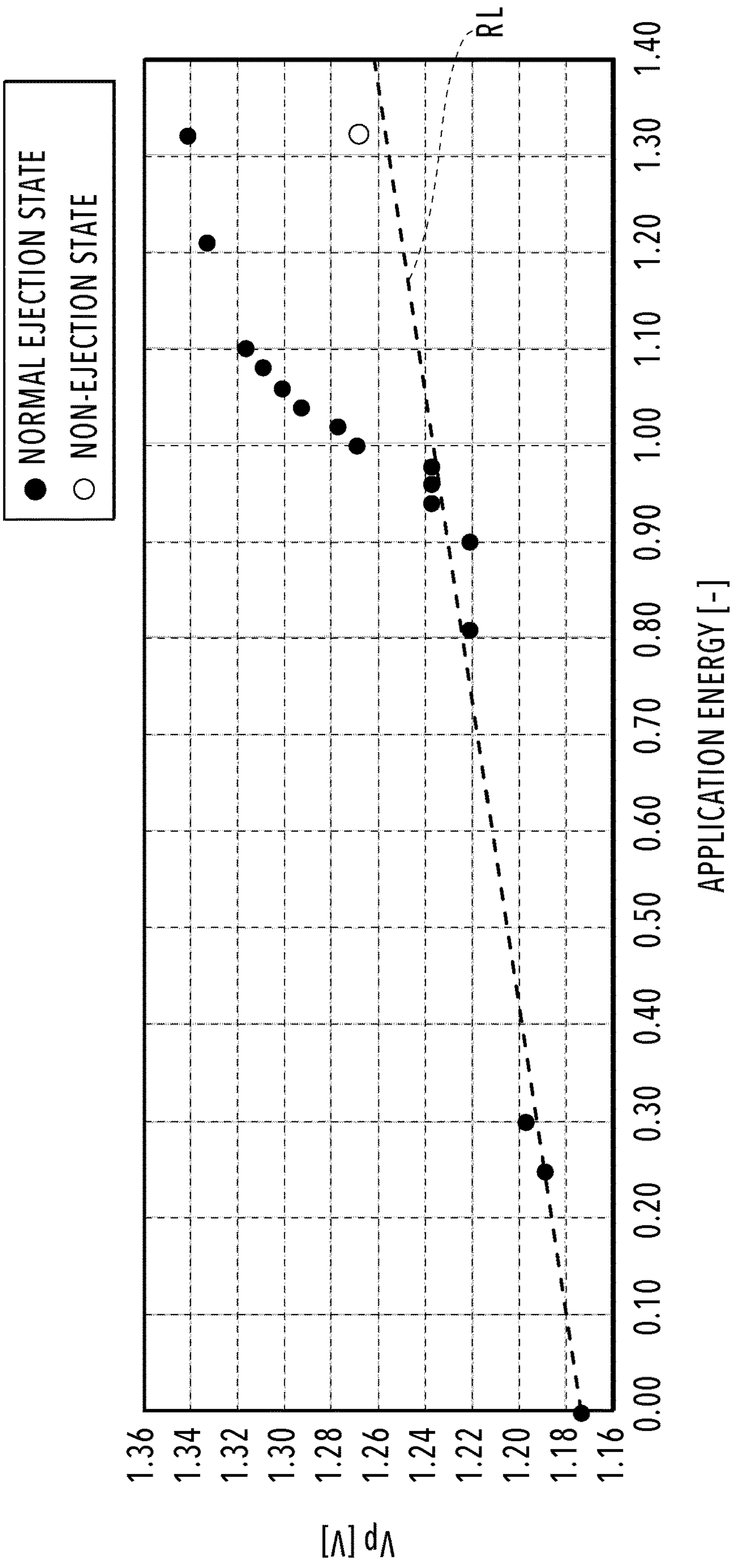
FIG. 13 is a diagram showing a state where energy "zero" is selected as energy below the minimum ejection energy.

The first to fifth embodiments described above use the peak voltage Vp obtained by application of energy in the non-ejection state. Zero (0) energy may be used as this application energy in the non-ejection state. For example, as shown in FIG. 13, three peak voltages Vp corresponding to three values of application energy, namely E=0, 0.25, and 0.3, may be added to the peak voltages shown in FIG. 9A. The regression line RL shown in FIG. 13 shows a regression line calculated by the method of least squares using the peak voltages Vp including the additional three peak voltages corresponding to all the values of minimum ejection enabling energy. Also, as shown in FIG. 13, the output voltage Vp_ft in the non-ejection state may be estimated using the peak voltage Vp corresponding to E=0.

Note that in a case where E=0, the peak voltage Vp is outputted without application of energy, and this is equivalent to the offset voltage Vofs shown in FIG. 6D described earlier. Thus, as long as the value of the offset voltage Vofs is known, the peak voltage Vp in the non-ejection state corresponding to one level of application energy is known. Thus, the threshold voltage Dth can be calculated only by measuring at least one other value of peak voltage Vp in the non-ejection state. This can shorten the time it takes to measure the peak voltage Vp, which in turn can shorten the setting of the threshold voltage Dth. However, the value of the offset voltage Vofs varies depending on the manufacturing variability in the print head or the variability in the electric circuits in the printing apparatus, and therefore, it is important that the measurement be done on the printing apparatus the ejection state of which is to be determined. Thus, it is desirable that the offset voltage Vofs be measured while the printing apparatus is in standby, not determining the ejection state or not performing the print operation.

Also, in the embodiments above, in selecting at least two levels of energy from a plurality of levels of energy that bring about the non-ejection state, a combination of values of energy that are apart from each other is preferably selected. This is because, with the temperature detection element 905 with low sensitivity to temperature, the amount of change in the peak voltage Vp is very small especially for the energy below the minimum ejection enabling energy, which may lead to large error in the estimation of the peak voltage Vp_ft in the non-ejection state. Thus, to estimate the peak voltage Vp_ft in the non-ejection state with high accuracy, among the at least two levels of energy in the non-ejection state, the farthest-apart two values of energy with a difference of one-tenth or more of the minimum ejection enabling energy are desirably selected.

Also, although the present disclosure carries out the ejection state determination by setting the threshold voltage Dth for ejection state determination, the setting of the threshold voltage Dth is desirably carried out for all the ejection element parts except for the ones determined as not ejecting. This is because the value of the threshold voltage Dth varies depending on the manufacturing variability in the heaters 15 and the temperature detection elements 905. For example, variability in the film thicknesses or resistances of the heaters 15 causes variability in the values of the minimum ejection enabling energy among the ejection element parts. In general, ejection ports in one array eject liquid using the same application energy. Thus, with different values of the minimum ejection enabling energy, temperature change also varies among the ejection element parts, and consequently, the threshold voltage Dth varies among the ejection element parts. In view of this situation, it is preferable to measure the peak voltage Vp with ejection enabling energy in the non-ejection state and set the determination threshold voltage Dth, for all the ejection element parts.

However, in the print head 3 including a plurality of print element boards 10 like in the present disclosure, there are several tens to hundreds of thousands of ejection element parts, and it may be difficult to store the threshold voltages Dth for all those enormous number of ejection element parts. In such a case, for example, the threshold voltage Dth of one of neighboring 32 ejection element parts may be set. Because manufacturing variability tends to be small among close ejection element parts, it is preferable that ejection element parts in one group be ones close to each other. In a case where a plurality of ejection element parts are put together as one group as described above, the threshold setting processing of the embodiments described above may be applied to a particular representative one of the ejection element parts in one group to set the threshold voltage Dth for that particular ejection element part. In this case, it is conceivable that the threshold voltages Dth for the temperature detection elements other than the particular temperature detection element are set based on the threshold voltage Dth set for the particular temperature detection element.

Also, after finding the threshold voltages Dth by applying the threshold setting processing of the embodiments described above to a plurality of ejection element parts in one group, the mean or median may be calculated after exclusion of outliers, and the mean or median may be set as the representative threshold voltage Dth of the one group. While various modes are conceivable for the setting of the threshold voltage Dth for each group, in either mode, the threshold voltage Dth may be set by applying the processing in the embodiments described above to at least one of the ejection element parts in one group.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the configuration of the present disclosure, the ejection state of a liquid ejection head can be determined properly while reducing influence by manufacturing variability in the liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-157460 filed Sep. 30, 2022, which is hereby incorporated by reference herein in its entirety.

What is claimed is:

1. A liquid ejection apparatus including a liquid ejection head, the liquid ejection head including (1) a heat generating resistance element, (2) a temperature detection element that detects temperature corresponding to an amount of heat generated by the heat generating resistance element, and (3) an ejection port provided in correspondence with the heat generating resistance element, the liquid ejection apparatus being configured to eject liquid from the ejection port by driving the heat generating resistance element, the liquid ejection apparatus comprising:

an output unit configured to output a value in accordance with a detection output from the temperature detection element;

a threshold setting unit configured to set a determination threshold for determining an ejection state of the liquid ejection head using first energy, the determination threshold being set based on (1) a first output value outputted from the output unit in a case where the heat generating resistance element is driven with the first energy in an ejection state in which the liquid is ejected from the ejection port and (2) a second output value estimated to be outputted from the output unit assuming the heat generating resistance element is driven with the first energy in a non-ejection state in which the liquid is not ejected; and a determination unit configured to determine the ejection state by comparing an output value outputted from the output unit in a case where the heat generating resistance element is driven with the first energy with the determination threshold, wherein the threshold setting unit estimates the second output value by using (1) an output value outputted from the output unit in a case where the heat generating resistance element is driven with second energy in the non-ejection state and (2) a relation between output values outputted from the output unit in a case where the heat generating resistance element is driven and values of energy used to obtain the respective output values, which is measured in advance in the non-ejection state.

2. The liquid ejection apparatus according to claim 1, wherein the threshold setting unit calculates a regression line by using the output value outputted from the output unit in a case where the heat generating resistance element is driven with the second energy in the non-ejection state and the relation and estimates the second output value based on the regression line.

3. The liquid ejection apparatus according to claim 2, wherein the relation indicates a slope of the regression line.

4. The liquid ejection apparatus according to claim 1, wherein the non-ejection state is a state forcibly created by covering up the ejection port.

5. The liquid ejection apparatus according to claim 1, wherein the non-ejection state is a state where the heat generating resistance element is driven with energy smaller than minimum energy among values of energy that enable the liquid to be ejected from the ejection port.

6. The liquid ejection apparatus according to claim 1, wherein the threshold setting unit has a reference table including a plurality of combinations of the difference between the first output value and the second output value and the determination threshold and obtains, from the reference table, the determination threshold corresponding to the difference between the first output value and the second output value outputted from the output unit.

7. The liquid ejection apparatus according to claim 6, wherein the liquid ejection head includes a plurality of ejection element parts each including the heat generating resistance element and the ejection port and includes a plurality of the temperature detection elements corresponding to the respective plurality of ejection element parts, and wherein in a case where the difference between the first output value and the second output value outputted from the output unit corresponding to a certain one of the ejection element parts is smaller than a predetermined difference threshold, the threshold setting unit sets the determination threshold for the certain ejection element part by using the determination threshold defined for the ejection element part located around the certain ejection element part.

8. The liquid ejection apparatus according to claim 1, wherein the threshold setting unit sets, as the determination threshold, a sum of a product of the output value outputted from the output unit in a case where the heat generating resistance element is driven with the first energy and a constant k where k is greater than 0 and lower than 1 and a product of the output value outputted from the output unit in the non-ejection state and a constant (1-k).

9. The liquid ejection apparatus according to claim 8, wherein the constant k is equal to or greater than 0.1 and equal to or lower than 0.9.

10. The liquid ejection apparatus according to claim 1, wherein the determination threshold is set for every temperature detection element.

11. The liquid ejection apparatus according to claim 1, wherein the threshold setting unit carries out the setting of the determination threshold for a particular representative one of a plurality of the temperature detection elements and sets the determination threshold for the temperature detection element other than the particular temperature detection element based on the determination threshold set for the particular temperature detection element.

12. The liquid ejection apparatus according to claim 1, wherein the liquid ejection apparatus is a printing apparatus that performs printing on a printing medium by ejecting ink as the liquid from the ejection port of the liquid ejection head.

13. An ejection state determination apparatus for determining an ejection state of a liquid ejection head, the liquid ejection head including (1) a heat generating resistance element, (2) a temperature detection element that detects temperature corresponding to the heat generating resistance element, and (3) an ejection port provided in correspondence with the heat generating resistance element, the liquid ejection head being configured to eject liquid from the ejection port by driving of the heat generating resistance element, the ejection state determination apparatus comprising:

an output unit configured to output a value in accordance with a detection output from the temperature detection element;

a threshold setting unit configured to set a determination threshold for determining the ejection state of the liquid ejection head using the first energy, the determination threshold being set based on (1) a first output value outputted from the output unit in a case where the heat generating resistance element is driven with first energy in an ejection state in which the liquid is ejected from the ejection port and (2) a second output value estimated to be outputted from the output unit assuming the heat generating resistance element is driven with the first energy in a non-ejection state in which the liquid is not ejected; and a determination unit configured to determine the ejection state by comparing an output value outputted from the output unit in a case where the heat generating resistance element is driven with the first energy with the determination threshold, wherein the threshold setting unit estimates the second output value by using (1) an output value outputted from the output unit in an event where the heat generating resistance element is driven with second energy in the non-ejection state and (2) a relation between output values outputted from the output unit in an event where the heat generating resistance element is driven and values of energy used to obtain the respective output values, which is measured in advance in the non-ejection state.

* * * * *